(12) United States Patent
Thomas, Jr. et al.

(10) Patent No.: US 7,754,830 B2
(45) Date of Patent: Jul. 13, 2010

(54) POLYMERIZATION REACTION MONITORING WITH DETERMINATION OF INDUCED CONDENSING AGENT CONCENTRATION FOR PREVENTING DISCONTINUITY EVENTS

(75) Inventors: Daniel N. Thomas, Jr., Cross Lanes, WV (US); Eric J. Markel, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/407,019

(22) Filed: Mar. 19, 2009

(65) Prior Publication Data

US 2009/0234081 A1 Sep. 17, 2009

Related U.S. Application Data

(63) Continuation-in-part of application No. 11/599,122, filed on Nov. 14, 2006, now Pat. No. 7,683,140.

(60) Provisional application No. 60/842,747, filed on Sep. 7, 2006, provisional application No. 60/842,719, filed on Sep. 7, 2006.

(51) Int. Cl.
*C08F 2/00* (2006.01)
(52) U.S. Cl. ............... 526/61; 526/59; 526/60
(58) Field of Classification Search ............ 526/59, 526/60, 61
See application file for complete search history.

(56) References Cited

U.S. PATENT DOCUMENTS 3,056,771 A 10/1962 Lee et al. ............ 526/159
3,082,198 A 3/1963 Klein ............ 526/91
3,470,143 A 9/1969 Schrage et al. ............ 526/206

(Continued)

FOREIGN PATENT DOCUMENTS

EP 0 089 691 11/1989

(Continued)

OTHER PUBLICATIONS

Acoustic Emission Technology—A New Sensing Technique for Optimising Polyolefin Production, Process Analysis & Automation Ltd. (2000).

(Continued)

*Primary Examiner*—David Wu
*Assistant Examiner*—Elizabeth Eng

(57) ABSTRACT

A method for monitoring a polymer resin-producing polymerization reaction in a fluid bed reactor, including by determining in on-line fashion a maximum diluent (e.g., ICA) concentration and an optimal diluent (e.g., ICA) concentration in the reactor, whereby performing the reaction with diluent (e.g., ICA) concentration less than the maximum diluent concentration ensures an acceptably low risk that the resin in the reactor in the presence of condensable diluent gas will reach a condition of limiting stickiness. Preferably, the optimal diluent concentration maximizes production rate subject to relevant constraints. The method can also include at least one of the steps of controlling the reaction to achieve a desired production rate by controlling diluent (e.g., ICA) concentration, and controlling the reaction to prevent reactor temperature from reaching a reduced melt reference temperature at least substantially equal to a dry melt reference temperature minus a temperature depression value by which the dry melt reference temperature is depressed by presence of at least one condensable diluent gas with the resin in the reactor.

64 Claims, 4 Drawing Sheets

Fluidized Bed Reaction System

U.S. PATENT DOCUMENTS

| | | | |
|---|---|---|---|
| 3,919,185 A | 11/1975 | Takebe et al. | 526/74 |
| 4,012,574 A | 3/1977 | Jones et al. | 526/74 |
| 4,194,073 A | 3/1980 | McDaniel | 526/98 |
| 4,232,140 A | 11/1980 | Ort | 526/129 |
| 4,302,566 A | 11/1981 | Karol et al. | |
| 4,405,495 A | 9/1983 | Lee et al. | 252/429 B |
| 4,543,399 A | 9/1985 | Jenkins et al. | 526/70 |
| 4,588,790 A | 5/1986 | Jenkins et al. | 526/70 |
| 4,593,010 A | 6/1986 | Malpass | 502/115 |
| 4,704,491 A | 11/1987 | Tsutsui et al. | 585/10 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 5,026,795 A | 6/1991 | Hogan | |
| 5,037,905 A | 8/1991 | Cummings et al. | 526/74 |
| 5,066,736 A | 11/1991 | Dumain et al. | 526/82 |
| 5,084,534 A | 1/1992 | Welborn, Jr. et al. | 526/160 |
| 5,086,134 A | 2/1992 | Antberg et al. | 526/126 |
| 5,194,526 A | 3/1993 | Hussein et al. | 526/74 |
| 5,218,071 A | 6/1993 | Tsutsui et al. | 526/348 |
| 5,258,475 A | 11/1993 | Kissin | 526/129 |
| 5,281,679 A | 1/1994 | Jejelowo et al. | 526/114 |
| 5,290,745 A | 3/1994 | Jorgensen et al. | 502/109 |
| 5,324,800 A | 6/1994 | Wellborn, Jr. et al. | 526/160 |
| 5,342,907 A | 8/1994 | Cann et al. | 526/129 |
| 5,352,749 A | 10/1994 | DeChellis et al. | 526/68 |
| 5,376,439 A | 12/1994 | Hodgson et al. | 428/220 |
| 5,387,660 A | 2/1995 | Doyle et al. | 526/69 |
| 5,391,657 A * | 2/1995 | Song et al. | 526/74 |
| 5,405,922 A | 4/1995 | DeChellis et al. | 526/68 |
| 5,410,002 A | 4/1995 | Govoni et al. | 526/88 |
| 5,436,304 A | 7/1995 | Griffin et al. | 526/68 |
| 5,453,471 A | 9/1995 | Bernier et al. | 526/68 |
| 5,462,999 A | 10/1995 | Griffin et al. | 526/68 |
| 5,510,433 A * | 4/1996 | Baker et al. | 526/74 |
| 5,523,435 A | 6/1996 | Lisowsky | 556/11 |
| 5,525,689 A | 6/1996 | Tsutsui et al. | 526/160 |
| 5,532,749 A | 7/1996 | Hong | 348/449 |
| 5,541,272 A | 7/1996 | Schmid et al. | 526/160 |
| 5,550,094 A | 8/1996 | Ali et al. | 502/115 |
| 5,616,661 A | 4/1997 | Eisinger et al. | 526/88 |
| 5,624,878 A | 4/1997 | Devore et al. | 502/152 |
| 5,674,795 A | 10/1997 | Wasserman et al. | 502/9 |
| 5,767,208 A | 6/1998 | Turner et al. | 526/160 |
| 5,990,251 A | 11/1999 | Gelus | |
| 6,124,229 A | 9/2000 | Becker et al. | 502/102 |
| 6,147,172 A | 11/2000 | Brown et al. | 526/126 |
| 6,234,950 B1 | 5/2001 | von Haken Spence et al. | 506/155 |
| 6,235,671 B1 | 5/2001 | McKay et al. | 502/110 |
| 6,235,672 B1 | 5/2001 | McKay et al. | 502/155 |
| 6,239,061 B1 | 5/2001 | Wang et al. | 502/162 |
| 6,239,238 B1 | 5/2001 | Brown et al. | 526/161 |
| 6,248,845 B1 | 6/2001 | Loveday et al. | 526/113 |
| 6,281,306 B1 | 8/2001 | Oskam et al. | 526/161 |
| 6,313,236 B1 | 11/2001 | Ford et al. | 526/74 |
| 6,355,744 B1 | 3/2002 | von Haken Spence et al. | 526/127 |
| 6,417,298 B1 | 7/2002 | Ford et al. | 526/89 |
| 6,455,638 B2 | 9/2002 | Laughner et al. | 525/191 |
| 6,486,273 B1 | 11/2002 | McKay et al. | 526/113 |
| 6,534,613 B2 | 3/2003 | Ford et al. | 526/352 |
| 6,579,998 B2 | 6/2003 | Sita et al. | 556/53 |
| 6,649,558 B2 | 11/2003 | Brown et al. | 502/155 |
| 6,656,866 B2 | 12/2003 | Wenzel et al. | 502/117 |
| 6,656,868 B2 | 12/2003 | Oskam et al. | 502/155 |
| 6,660,815 B2 | 12/2003 | Agapiou et al. | 526/130 |
| 7,122,607 B2 | 10/2006 | Hagerty et al. | 526/73 |
| 7,300,987 B2 | 11/2007 | Hagerty et al. | 526/73 |
| 7,459,510 B2 | 12/2008 | Lin et al. | 526/135 |
| 7,507,780 B2 | 3/2009 | Hagerty et al. | 526/73 |
| 2001/0044505 A1 | 11/2001 | Ford et al. | 526/62 |
| 2002/0198335 A1 | 12/2002 | Bernier et al. | 526/88 |
| 2003/0100688 A1 | 5/2003 | Farrer et al. | 526/110 |
| 2003/0121330 A1 * | 7/2003 | Muhle et al. | 73/600 |
| 2003/0171512 A1 | 9/2003 | Mawson et al. | 526/129 |
| 2004/0063871 A1 | 4/2004 | Parrish et al. | 526/61 |
| 2005/0267269 A1 | 12/2005 | Hagerty et al. | 526/68 |
| 2007/0043174 A1 | 2/2007 | Parrish et al. | 526/59 |
| 2007/0060721 A1 | 3/2007 | Muhle et al. | 526/59 |
| 2007/0073010 A1 | 3/2007 | Pannell et al. | 526/73 |
| 2008/0065360 A1 | 3/2008 | Pannell et al. | 703/2 |

FOREIGN PATENT DOCUMENTS

| | | |
|---|---|---|
| EP | 0413326 A2 | 2/1991 |
| EP | 0443686 A2 | 8/1991 |
| EP | 0481480 A1 | 4/1992 |
| EP | 0495099 A1 | 7/1992 |
| EP | 0 549 252 | 6/1993 |
| EP | 0 366823 | 9/1993 |
| EP | 0596553 A2 | 5/1994 |
| EP | 0612768 A1 | 8/1994 |
| EP | 0 453 116 | 4/1995 |
| EP | 0284707 B1 | 8/1995 |
| EP | 0669346 A1 | 8/1995 |
| EP | 0 754 708 | 1/1997 |
| EP | 0773239 A2 | 5/1997 |
| EP | 0781789 A2 | 7/1997 |
| EP | 0668296 B2 | 6/1998 |
| EP | 0 722 955 | 1/1999 |
| EP | 0 794 200 | 7/2000 |
| EP | 1323746 | 2/2009 |
| JP | 09-176400 | 7/1997 |
| WO | 94/03509 | 2/1994 |
| WO | WO 97/14721 | 4/1997 |
| WO | 97/22635 | 6/1997 |
| WO | 98/02470 | 1/1998 |
| WO | 99/61486 A1 | 12/1999 |
| WO | 02/46250 A2 | 6/2002 |
| WO | WO 03/010211 | 2/2003 |
| WO | WO 03/051929 | 6/2003 |
| WO | WO 2004/058825 | 7/2004 |
| WO | WO 2004/058827 | 7/2004 |
| WO | WO 2004/058828 | 7/2004 |
| WO | WO 2005/049663 | 6/2005 |
| WO | 2005/113615 A2 | 12/2005 |
| WO | WO 2005/113610 | 12/2005 |
| WO | WO 2005/113615 | 12/2005 |
| WO | WO 2006/009980 | 1/2006 |
| WO | WO 2008/030313 | 3/2008 |

OTHER PUBLICATIONS

Agglomeration Detection by Acoustic Emission, Process Analysis & Automation Ltd. (2000), Application note: 2002/111.

Ardell et al., "Model Prediction for Reactor Control," Chemical Engineering Progress, American Institute of Chemical Engineers, vol. 79, No. 6, pp. 77-83 (1983).

Heiland, Kirstin and Kaminsky, Walter "*Comparison of zirconocene and hafnocene catalysts for the polymerization of ethylene and 1-butene*" Makromol. Chem., vol. 193, pp. 601-610 (1992).

Tian, Jun and Huang, Baotong, "*Ethylene polymerization with catalyst systems based on metallocenes with varying steric hindrance and methylaluminoxane*" Macromol. Rapid Commun., 15, 923-928 (1994).

Usami, Takao et al., "*Generation Mechanism of Short-Chain Branching Distribution in Linear Low-Density Polyethylenes*" Macromolecules, vol. 19, pp. 2722-2726 (1986).

\* cited by examiner

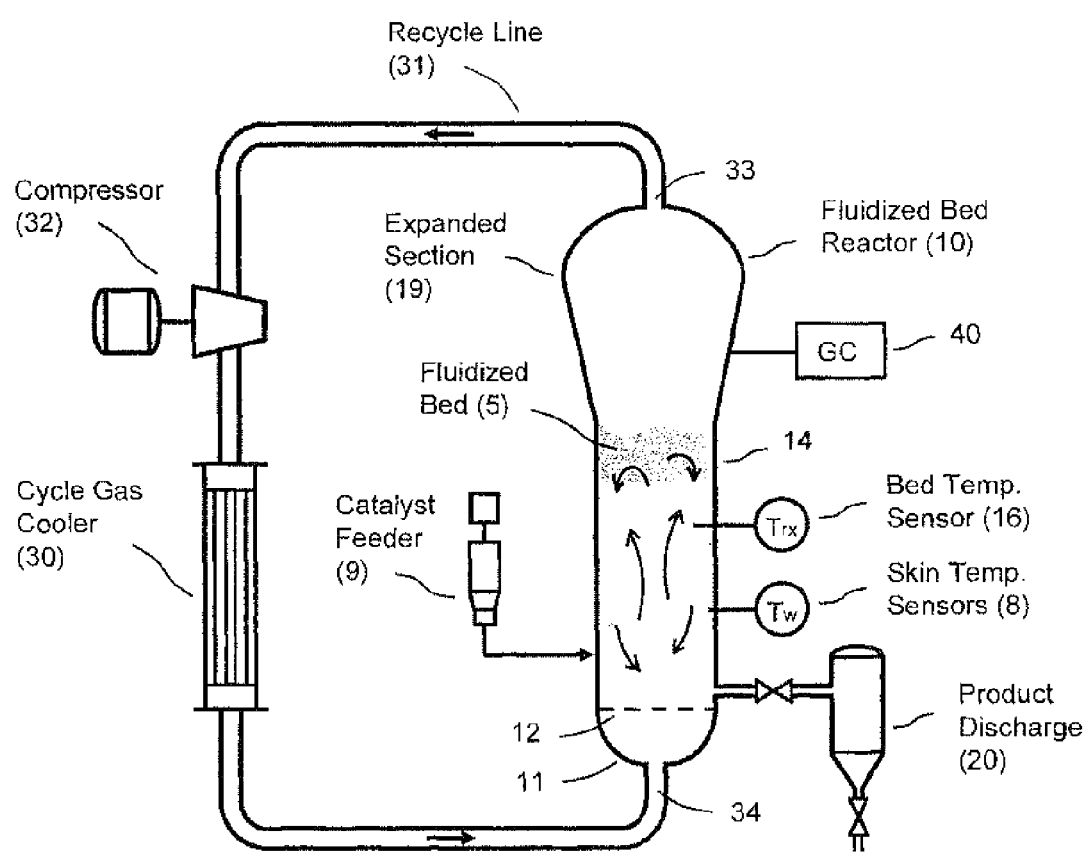
Figure 1 – Fluidized Bed Reaction System

Figure 2 – Process For Monitoring And
Control of Reactor Stickiness and/or Static
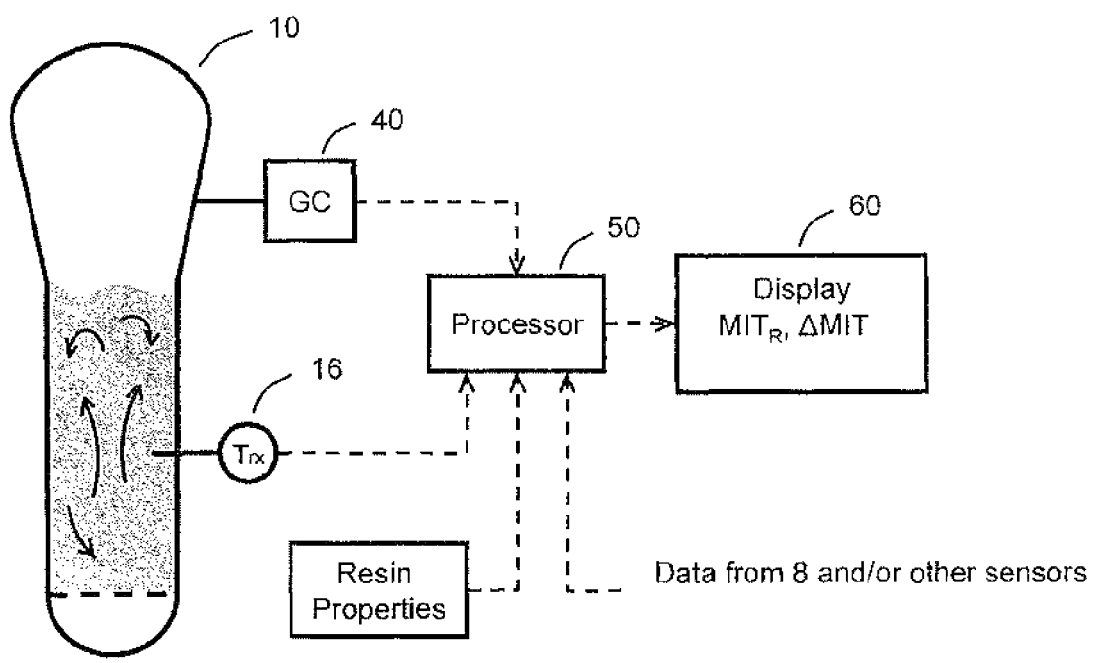

Figure 3 – First Melt DSC Curve
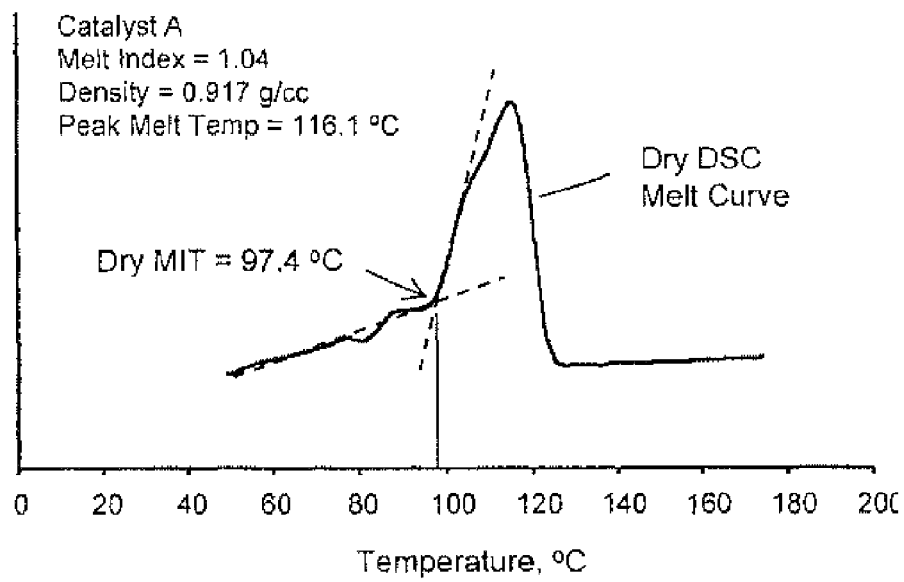
Figure 4 – Displaced MIT (MIT$_R$)
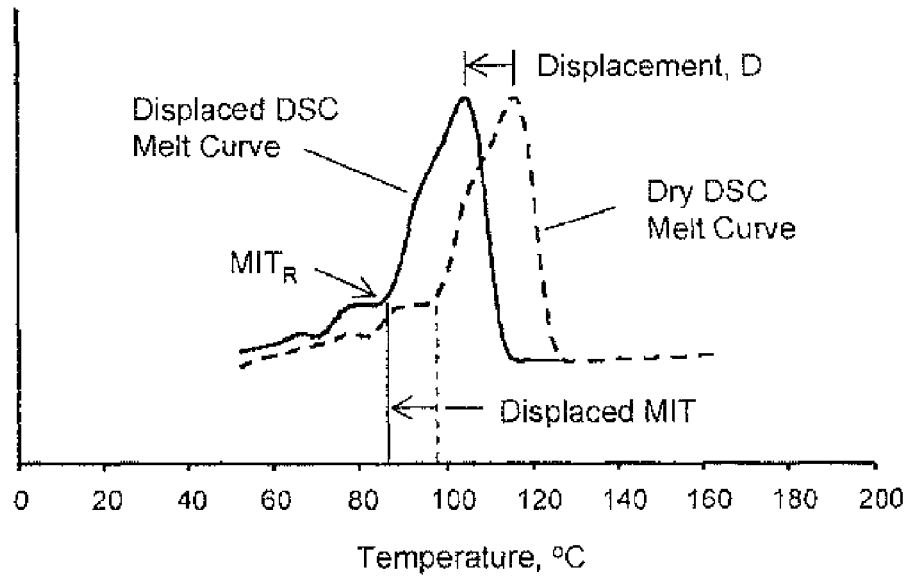

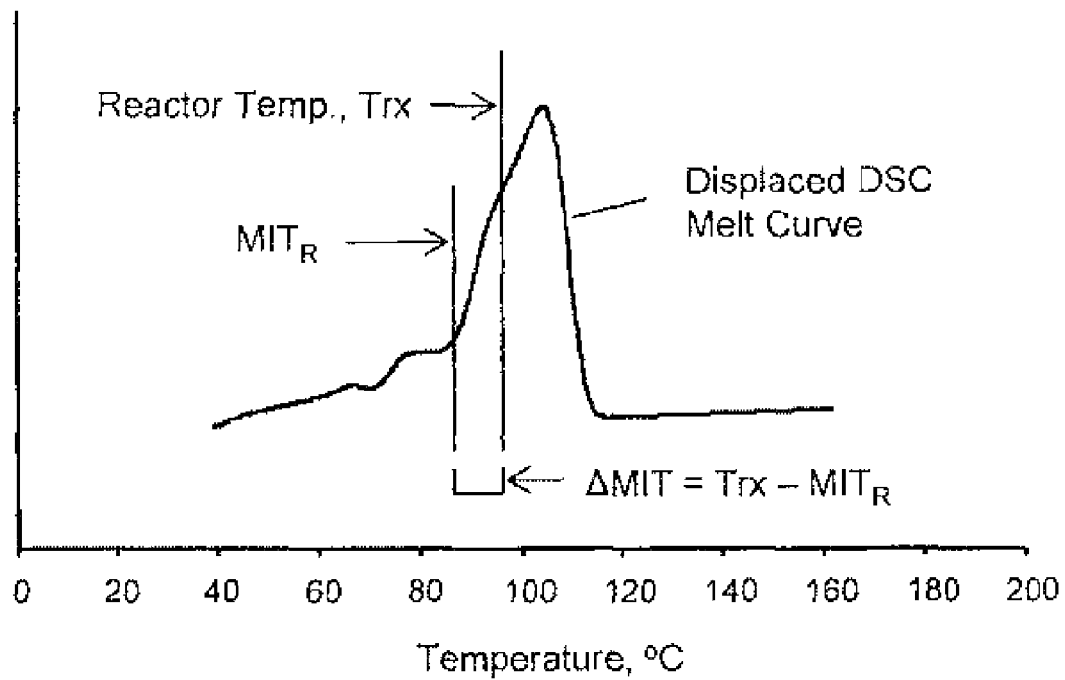

POLYMERIZATION REACTION MONITORING WITH DETERMINATION OF INDUCED CONDENSING AGENT CONCENTRATION FOR PREVENTING DISCONTINUITY EVENTS

CROSS-REFERENCE TO RELATED APPLICATIONS

This application is a continuation-in-part of Ser. No. 11/599,122, filed Nov. 14, 2006 now U.S. Pat. No. 7,683,140, that claims the benefit of Ser. No. 60/842,747, filed Sep. 7, 2006, and Ser. No. 60/842,719, filed Sep. 7, 2006.

FIELD OF THE INVENTION

The invention pertains to methods for monitoring a resin-producing polymerization reaction (e.g., an olefin polymerization reaction) in a gas phase fluidized-bed reactor and determining in on-line fashion, from data indicative of at least one monitored reaction parameter, a condensable diluent concentration (e.g., an induced condensing agent or "ICA" concentration, or an optimal ICA concentration) in the reactor for performing the reaction with acceptably low risk that the polymer resin in the reactor will reach a condition of limiting stickiness, and optionally also controlling the reaction in response to such determination.

BACKGROUND

Throughout this disclosure, expression "diluent" denotes condensable gas (or a mixture of condensable gases) or liquid present in a polymerization reactor with polymer resin being produced. The expression "diluent gas" (or "condensable diluent" or "condensable diluent gas") denotes condensable gas (or a mixture of condensable gases) present in a polymerization reactor with polymer resin being produced. The diluent gas is condensable at the temperatures encountered in the process heat exchanger. Examples of diluents include induced condensing agents ("ICAs"), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted monomers, comonomers and ICAs that had been dissolved in the polymer at the time of production. As will be discussed herein, a dry version of polymer resin has significantly different melting (and sticking) behavior than would the same polymer resin if it were in the presence of a significant amount of condensable diluent gas and comonomer.

The expression "optimal" diluent concentration (e.g., "optimal" ICA concentration) for a polymer resin-producing polymerization reaction herein denotes a diluent concentration that achieves or is expected to achieve a desired production rate for the reaction subject to at least one predetermined constraint (e.g., at least one constraint on properties of the polymer resin being produced and/or constraints on reactant and catalyst feed rates, cooling capacity, and reactor temperature). For example, in some cases an "optimal" diluent (e.g., ICA) concentration is a concentration of the diluent (e.g., ICA) which maximizes production rate with reactant and catalyst feed rates within predetermined limits with an acceptably low risk of occurrence of a reactor sheeting, or of a discontinuity event, or of an undesirable production rate constraint due to reduced resin flowability. For another example, an "optimal" diluent (e.g., ICA) concentration is a concentration of the diluent (e.g., ICA) which maximizes production rate without any constraint against occurrence of reactor sheeting or a discontinuity event (or a downstream flowability limitation).

The expression "on-line generation" of a value (or data) during a reaction herein denotes generation of the data sufficiently rapidly so that the value or data is available essentially instantaneously for use during the reaction. The expression "generation of" a value or data "in on-line fashion" during a reaction is used synonymously with the expression on-line generation of a value (or data) during a reaction. Generation of data from a laboratory test (on at least one substance employed or generated in the reaction) is not considered "on-line generation" of data during the reaction, if the laboratory test consumes so much time that parameters of the reaction may change significantly during the time required to conduct the test. It is contemplated that on-line generation of data may include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. Because of the back-mixed nature of a gas phase polymerization reactor, the most recently produced polymer product typically undergoes mixing with previously produced quantities of product before a mixture of the recently and previously produced product exits the reactor. In contrast, with reference to a product being produced by a continuous reaction, the expression "average" (or "bed average") value (at a time "T") of a property herein denotes the value of the property of the product that exits the reactor at time T.

The expression "polyethylene" denotes at least one polymer of ethylene and optionally one or more $C_3$-$C_{10}$ α-olefins, while the expression polyolefin denotes at least one polymer (or copolymer) of one or more $C_2$-$C_{10}$ α-olefins.

Throughout this disclosure, the abbreviation "MI" denotes melt index ($I_2$) of the polymer product, measured in accordance with ASTM-D-1238-E unless otherwise stated. Also throughout this disclosure, the term "density" denotes the intrinsic material density of a polymer product (in units of g/cc), measured in accordance with ASTM-D-1505-98 unless otherwise stated.

One method for producing polymers is gas phase polymerization. A conventional gas phase fluidized bed reactor, commonly employs a fluidized dense-phase bed typically including a mixture of reaction gas, polymer (resin) particles, catalyst, liquid additive(s), and (optionally) continuity aids (for improving fluidization) and/or other additives. Typically, any of several process control variables will cause the reaction product to have certain, preferably desired, characteristics.

Generally in a gas-phase fluidized bed process for producing polymers from monomers, a gaseous stream containing one or more monomers is continuously passed through a fluidized bed under reactive conditions in the presence of an activated catalyst. This gaseous stream is optionally withdrawn from the top of the fluidized bed and recycled back into the reactor. Simultaneously, polymer product is withdrawn from the reactor and new monomer is added to replace the polymerized monomer. The recycled gas stream is heated in the reactor by the heat of polymerization. This heat is typically removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to control the reactor temperature to prevent excessive stickiness of polymer particles that if left unchecked, may result in loss of fluidization or agglomeration of the sticky particles which may lead to formation of chunks or sheets of fused polymer that cannot be removed as product. Excessive stickiness left unchecked may also limit reactor rates due to flowability limitations in the product discharge system, product conveying, product purging, rotary feeders, or other downstream process equipment.

The production of such chunks or sheets can present significant operational problems in fluidized bed reactor systems because, once formed, the fused chunks or sheets may fall onto the distributor plate causing impaired fluidization and mixing, which in many cases requires a reactor shutdown for cleaning. Prevention of such excessive resin stickiness has been accomplished by controlling the temperature of the fluid bed to a temperature just below the fusion or sintering temperature of the polymer particles. Above this fusion or sintering temperature, empirical evidence suggests that such fusion or sintering leads to agglomeration or stickiness in the polymer product, which can in turn (if left unchecked) lead to the above conditions.

In addition, the amount of polymer produced in a fluidized bed polymerization process is directly related to the amount of heat that can be withdrawn from the fluidized bed reaction zone. In steady state operation of the reaction process, ideally, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficiently high to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point may be calculated knowing the gas composition, and may be thermodynamically defined.

Contrary to this belief, as suggested by Jenkins et al. in U.S. Pat. Nos. 4,543,399 and 4,588,790, a recycle stream can be cooled to a temperature below the dew point in a fluidized bed polymerization process resulting in condensing a portion of the recycle gas stream. The resulting stream containing entrained liquid can be returned to the reactor without causing the aforementioned agglomeration and/or plugging phenomena (which was generally expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the polymer production rate per unit of reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in condensed mode operation remains entrained or suspended in the gas phase portion of the mixture. Vaporization of the liquid occurs only when heat is added or pressure is reduced. In this process, vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the increased (sensible) heat transfer associated with the lower temperatures of the gas stream entering the fluidized bed. Both of these factors increase the overall heat removal capability of the system and thereby enable higher space-time yields.

Jenkins, et al. illustrate the difficulty and complexity of such condensed mode reaction control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option for doing so is to add non-polymerizing, non-reactive materials to the reactor, which are in the gaseous state in the fluidized bed section of the reactor, but are condensable at the lower temperatures encountered in the process heat exchanger. Such non-reactive, condensable materials are collectively known as induced condensing agents (ICAs) since they "induce" additional condensing in the system. Increasing concentrations of ICA in the reactor cause corresponding increases in the dew point temperature of the reactor gas, which (for a given heat exchanger temperature) promotes higher levels of condensing for higher heat-transfer limited production rates for the reaction. Suitable ICA materials are selected based on their specific heat and boiling point properties. In particular, ICA compounds are selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

U.S. Pat. No. 5,352,749, teaches among other things that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. U.S. Pat. Nos. 5,352,749, 5,405,922 and 5,436,304, suggest upper limits of ICA in the reactor, depending on the type of polymer being produced. The authors characterized the upper limit of condensable materials by tracking the ratio of fluidized bulk density to settled bulk density. As the concentration of isopentane (ICA) was increased in an otherwise steady-state reaction, they found that the bulk density ratio steadily decreased. When the concentration of isopentane was sufficiently high, corresponding to a bulk density ratio of 0.59, they found that fluidization in the reactor was lost. They, therefore, determined that this ratio (0.59) represented a limiting value below which a reactor would cease functioning due to loss of fluidization.

As described in U.S. Pat. No. 7,122,607, attempts to operate polymerization reactors with excessive ICA concentrations cause polymer particles suspended in the fluid bed to become cohesive or "sticky," and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting or chunking. Chunks are solid masses of polymer that can form within the interior of the fluidized bed. Sheets are solid masses of polymer that can form on the interior reactor walls. The sheets eventually become dislodged from the walls and fall into the reaction section. These solid masses of polymer (sheets or chunks) may settle on the distributor plate, where they interfere with fluidization, block the product discharge port, and usually force a reactor shut-down for cleaning and/or limit production rates until the reactor can be shut down. The lost production associated with such forced reactor shut-downs can have significant economic impact in large-scale, commercial production plants.

At least two distinct types of sheets can be formed in gas phase reactors: wall sheets or dome sheets, depending on where they are formed in the reactor. Wall sheets are formed on the walls (generally vertical walls) of the reaction section. Dome sheets are formed higher in the reactor, on the conical section of the dome, or on the hemispherical head on the top of the reactor.

When sheeting occurs with Ziegler-Natta catalysts, it is generally wall sheeting in the lower portion of the reaction section. Ziegler-Natta catalysts are capable of forming dome sheets, but the occurrence is rare. With metallocene catalysts, however, sheeting can occur in either or both locations (i.e. both wall sheeting and dome sheeting can occur). Dome sheeting has been particularly troublesome with metallocene catalyst systems.

The expression "discontinuity event" is used herein to describe a forced disruption in the continuous operation of a polymerization reactor caused by sheeting (e.g., wall or dome sheeting), chunking, or fouling of the gas recycle system. The terms "sheeting" and/or "chunking" while used synonymously herein, may describe different manifestations of problems discussed herein. In either manifestation (sheeting or chucking), the excessive polymer stickiness may lead directly to a reactor discontinuity event with the associated loss production, or to a reduced production rate due to reduced resin flowability (e.g., an unacceptably low rate of withdrawing resin from the reactor due to reduced flowability of sticky resin). Herein, the expression "stickiness" is used to denote a property of resin that is sometimes alternatively referred to as softness, or cohesiveness, or stickiness.

The expression "limiting stickiness" of polymer resin in a reactor (during a polymerization reaction in the reactor in the presence of reaction and diluent gases) herein denotes a condition of the resin which presents an unacceptably high risk of imminent occurrence of a discontinuity event in the reactor, or an unacceptably high risk of imminent occurrence of an undesirable production rate constraint due to reduced resin flowability (e.g., an unacceptably low rate of withdrawing resin from the reactor due to reduced resin flowability). In addition to causing a low rate of withdrawing resin from the reactor, resin stickiness can also limit rates by limiting product conveying to the product purge bin or reduce product flow rates out of the purging equipment or other downstream equipment.

Throughout this disclosure, each of the terms "fusion temperature," "sintering temperature," and "sticking temperature" denotes a temperature in a reactor (during a polymerization reaction in the presence of reaction and diluent gases) at which polymer resin in the reactor reaches a condition of limiting stickiness, thereby presenting an unacceptably high risk of imminent occurrence of a discontinuity event in the reactor (or of an undesirable production rate constraint due to reduced resin flowability).

Adding to the complexity of control of stickiness while using ICAs, different polymer products vary widely in their ability to tolerate ICA materials, some having a relatively high tolerance (expressed in partial pressure of the ICA in the reactor). For example, some polymers can tolerate as much as 50 psia of ICA, while other polymers can tolerate only 5 psia or less. With these latter polymers, the heat-transfer limited production rates under similar conditions are substantially lower. Polymers which possess a more uniform comonomer composition distribution are known to have a higher tolerance to the partial pressure of the ICA in the reactor. Metallocene catalyst produced polymers are a good example of polymers with such a more uniform comonomer composition. However, at some point even these metallocene produced polymers reach a limiting ICA concentration that induces stickiness. The limiting ICA concentration depends on several factors in addition to the polymer type (which determines polymer properties such as melt index and density which affect stickiness and the limiting ICA concentration), including reactor temperature, comonomer type and concentration, etc. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Discontinuity events at large-scale, gas phase polymer production plants are expensive. Further, risks associated with experimentation in such plants are high due to the high cost of reactor downtime. Therefore, it is difficult to explore design and operating boundaries experimentally in view of the costs and risks involved.

It would be desirable to provide a method of determining a stable operating condition for gas fluidized bed polymerization, especially if operating in condensed mode, to facilitate optimum design of the plant and the determination of desirable process conditions for optimum or maximum production rates in a given plant design.

It would also be desirable to have a mechanism in commercial gas-phase reactors to detect the onset of stickiness (in on-line fashion) that is a better or an earlier indicator of the onset of stickiness than are conventional techniques (e.g., monitoring the fluidized bulk density as described in U.S. Pat. No. 5,352,749). Such a mechanism would allow the operators (or automated control system) to determine when conditions of limiting stickiness were being approached, and enable them to take corrective action before discontinuity events (such as sheeting and chunking) occurred, while keeping the reactors at or near conditions of optimal (e.g., maximum) ICA concentration, permitting higher production rates with substantially less risk.

PCT Application WO 2005/113615 and related U.S. Pat. No. 7,122,607 describe the determination of a critical temperature below which resin in a polymerization reactor cannot become sticky, and use of this predetermined critical temperature to control the reactor. These references define "dry sticking temperature" of a polymer (to be produced in a fluidized bed polymerization reactor) as the temperature at which agglomeration within the bed or fouling on any surface of the reactor vessel begins to occur with the reactor operating at normal pressure and gas velocity, but in the presence of substantially pure nitrogen rather than the normal gas components. They define a liquid "melting point depression" as the temperature by which the melting point of the polymer in the reactor is depressed by liquid immersion of the polymer in the condensable diluent(s) (e.g., ICA and comonomer) to be used in the process. Because the measurements are carried out in the presence of each condensable diluent in a liquid (rather than gas) state, the determined liquid melting point depression represents the maximum amount by which the melting point can be depressed in a reactor operating in the gas phase with the same condensable diluent(s). The references also disclose the steps of determining the dry sticking temperature of a polymer to be produced, determining the liquid melting point depression for the reaction, and then operating the gas phase reactor process with a bed temperature below the "critical temperature" (defined as the dry sticking temperature minus the liquid melting point depression). The references teach that performing the reaction with the bed temperature below this critical temperature can prevent stickiness that could otherwise be induced in the resin due to high concentrations of condensable diluent(s).

The "critical temperature" (to be referred to herein as "CT") disclosed in WO 2005/113615 and U.S. Pat. No. 7,122,697 is a property of a specific polymer (e.g., a polyolefin) produced by a polymerization reaction in a gas phase fluidized-bed reactor. The CT is a temperature in the fluid bed below which the polymer cannot become sticky regardless of the concentration of condensable diluent(s) in the reactor. Thus, if the reactor were operated with a temperature equal to or less than the CT to produce the polymer in the fluid bed, it would be impossible for the polymer to become sticky even at the maximum depression of the polymer sticking temperature (whereas the actual amount of depression of the polymer sticking temperature would depend on the actual concentration of condensable diluent(s) in the reactor). CT varies with the characteristics of a polymer (e.g., density and MI) but not with temperature and other reaction conditions of the polymerization reaction which produces the polymer.

The CT disclosed in U.S. Pat. No. 7,122,697 is the polymer's dry sticking temperature minus the maximum melting point depression that could occur due to the presence of condensable diluent(s) in the reactor. For example, the difference between dry and fully immersed (liquid) Differential Scanning Calorimeter ("DSC") peak melting temperatures for the polymer is taken to be the maximum melting point depression, where the polymer dry sticking temperature is taken to be the DSC peak melting temperature of the dry polymer. The CT is typically not the same temperature as the temperature dMIT=$\Delta$MIT defined in the MIT application discussed below. The value of dMIT depends on the concentration of condensable diluent(s) in a polymerization reactor during production of a polymer, and thus can vary as a function of time during the reaction as diluent concentration changes. Depending on the current value of dMIT, the reaction may be subject to a high or low risk of occurrence of reactor sheeting or another discontinuity event. In contrast, the CT for a polymer is a limiting value that bounds the set of all the possible dMIT values that can exist during production of the polymer.

Above-referenced U.S. Patent Application No. 60/842,747 (the "MRT application") and U.S. Patent Application No. 60/842,719 (the "MIT application"), both filed on Sep. 7, 2006, describe methods for detecting conditions indicative of imminent occurrence of sheeting during polymerization reactions in fluid bed polymerization reactors, and optionally also controlling the reactions to prevent the occurrence of sheeting.

The MRT application describes a method including of the steps of: monitoring a polymerization reaction which produces a polymer resin in a fluid bed reactor, wherein a dry melt reference temperature is characteristic of melting behavior of a dry version of the polymer resin; and in response to data indicative of at least one monitored parameter of the reaction, determining, in on-line fashion, a reduced melt reference temperature characteristic of the melting behavior of the polymer resin as it exists in the reactor. The reduced melt reference temperature ($MRT_R$) is at least substantially equal to the difference between the dry melt reference temperature and a melt reference temperature depression value, "D," where D is a temperature by which the dry melt reference temperature is depressed by the presence of diluent that is present with the resin in the reactor. The method optionally also includes the steps of determining a stickiness control parameter (e.g., a $\Delta$MRT value) from the reduced melt reference temperature, and controlling the reaction in response to the stickiness control parameter. Herein the notation "dMRT" will be used to denote a $\Delta$MRT value of the type described in the MRT application.

The MIT application describes a specific method of applying the MRT method, including of the steps of:

(a) during a polymerization reaction in a fluid bed reactor which produces a polymer resin, measuring parameters of the reaction including at least reactor temperature, at least one resin property of the polymer resin, and concentration of at least one condensable diluent gas in the reactor;

(b) determining from the at least one resin property, using a predetermined correlation, a dry melt initiation temperature of a dry version of the polymer resin; and (c) during the reaction, using a melt initiation temperature depression model to determine, in on-line fashion from at least some of the parameters measured in step (a) and the dry melt initiation temperature value, a reduced melt initiation temperature for the polymer resin in the presence of the at least one condensable diluent gas, said melt initiation temperature depression model identifying an estimated degree of depression of the dry melt initiation temperature due to presence of at least one diluent with the polymer resin.

In typical embodiments, the melt initiation temperature depression model implements the well-known Flory melt depression equation. The method optionally also includes the step of:

(d) determining in on-line fashion a temperature value indicative of resin stickiness in the reactor, from the reduced melt initiation temperature determined in step (c) and a current value of the reactor temperature.

Typically, the temperature value generated in step (d) is a temperature value $\Delta$MIT that is at least substantially equal to $Trx-MIT_R$, where Trx is the current value of reactor temperature, and $MIT_R$ is the reduced melt initiation temperature determined in step (c). Herein the notation "dMIT" will be used to denote a ΔMIT value of the type described in the MIT application.

The MIT and MRT applications describe control of a polymerization reaction to prevent a stickiness control parameter (e.g., a dMIT value or dMRT value) from exceeding a limiting value (e.g., a limiting dMRT or dMIT value) or leaving a limiting range, including by adjusting the reactor temperature or ICA concentration to bring the stickiness control parameter back into an acceptable range. Adjustments in the reactor temperature (rather than ICA concentration) would generally be preferred for this purpose because of the relatively quick response times involved. The MIT application notes, for example, that if the stickiness control parameter were too high by 1° C., a reduction in reaction temperature of 1° C. could bring the stickiness control parameter back within range within a few minutes. In some cases, an excessively high stickiness control parameter can be corrected by lowering the concentration of ICA in the reactor, e.g., by reducing the rate of ICA feed to or increasing the rate of ICA venting from the reactor. However, the desired change in ICA concentration would occur relatively slowly (several hours would typically be required to change ICA concentration to a desired level).

It has been proposed to optimize ICA concentration in a polymerization reactor to achieve a desired production rate subject to constraints. For example, U.S. Patent Application Publication No. 2007/0043174 A1, published on Feb. 22, 2007, discloses a method for controlling a gas phase reaction (e.g., a gas phase, fluidized bed polymerization reaction) which includes steps of calculating an optimal concentration of ICA (induced condensation agent) or induced cooling agent in the reactor and controlling the flow of ICA or cooling agent to the reactor in order to achieve the optimal ICA (or cooling agent) concentration. In some embodiments, the optimal ICA concentration is said to be one which maximizes the polymer production rate subject to predetermined constraints which may include (for example) constraints on reactor feed monomer flow rate and cooling water flow rate. When an optimal ICA concentration has been determined, the actual ICA concentration may be reduced to the optimal concentration when this would not reduce the production rate (which is otherwise constrained) or may be increased to the optimal concentration when this would increase the production rate, provided that neither such concentration change would violate another constraint on the reaction. For example, consistent with the reference's teaching that bed temperature in a fluid bed polymerization reactor should be controlled to remain below the sintering temperature of the polymer being produced, the ICA concentration may be constrained against being changed to a level that causes the bed temperature to increase above the sintering temperature.

To calculate optimal ICA concentration, ICA limits must be taken into account including maximum and minimum ICA concentration based on reactor inlet dew point and condensing limits, as well as maximum ICA concentration to avoid resin stickiness. Excessive ICA concentrations have been shown to increase resin stickiness unacceptably which can reduce resin flowability and therefore reactor throughput, and can cause resin agglomeration or a discontinuity event. Violation of the maximum or minimum ICA concentration limit can lead to unwanted process upsets including loss of production capacity, offspec material, or possibly even reactor shutdown.

Conventional ICA optimization routines attempt to control ICA concentration to a level that provides sufficient cooling capacity for the desired production rate and cooling requirement while minimizing excess ICA, in an effort to maximize reactor throughput while minimizing ICA usage and improving raw material efficiency. It is known to maximize polymerization production rate by selecting an optimal ICA concentration subject to constraints, including the constraint of avoiding resin stickiness. Conventional ICA optimization programs provide for a ICA stickiness limit (e.g., a limiting value of ICA concentration beyond which resin stickiness may occur) to be input into the calculation routines. However, the resin stickiness models and correlations employed to perform conventional ICA optimization have been inadequate (so that the true ICA stickiness limit is not known) and have lacked the accuracy needed for controlling ICA concentration at or near the true stickiness limit. Due to the high risk and severe consequence of violating the maximum ICA stickiness limit and the poor accuracy of the stickiness models employed, conventional ICA optimization routines have used very conservative estimates of the maximum ICA concentration (for avoiding stickiness). These conservative constraints on allowable ICA concentration have typically been based on very limited operating data and their use has led to failure to achieve maximum reactor throughput (due to overlimiting of ICA concentration) as well as loss of raw materials when too much ICA is vented during transitions in order to operate within the excessively conservative ICA concentration limits. Although the true ICA stickiness limit is dependent on many dynamic process variables, conventional ICA optimization routines have also employed a constant ICA stickiness limit per product recipe.

It would be desirable to monitor a gas phase, fluidized bed polymerization reaction to obtain data that provide:

an early indication of impending sheeting or other discontinuity event (or of imminent occurrence of an undesirable production rate constraint due to reduced resin flowability) in the reactor that would provide sufficient advanced warning to enable the operators to make changes in the process to avoid the impending discontinuity event or production rate constraint; and an accurate estimate of limit(s) on allowable ICA concentration for use in determining optimal ICA concentration for the reaction.

Preferably, such monitoring would be done in an on-line fashion (e.g., during fluid bed polymerization reactions that employ metallocene catalysts, based on real-time measurements of the process parameters of that cause wall and dome sheeting when such catalysts are employed).

It would also be desirable to control a fluid bed polymerization reaction to maximize production rate by controlling temperature and/or diluent (e.g., ICA) concentration in response to an accurately determined optimal diluent (e.g., ICA) concentration (e.g., by reducing reactor temperature below the level that would have conventionally been considered a threshold and/or increasing ICA concentration above the level that would have conventionally been considered a threshold when appropriate).

SUMMARY OF THE INVENTION

In a class of embodiments, the invention is a method for monitoring a polymer resin-producing polymerization reaction in a fluid bed reactor, where a dry melt reference temperature is characteristic of melting behavior of a dry version of the polymer resin, said method including the steps of:

(a) monitoring the reaction to generate monitoring data indicative of at least one parameter of the reaction, including a concentration of at least one condensable diluent gas in the reactor;

(b) determining in on-line fashion a maximum diluent concentration in the reactor, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the maximum diluent concentration a greatest diluent concentration inconsistent with reactor temperature reaching the reduced melt reference temperature in the presence of the at least one condensable diluent gas, whereby performing the reaction with diluent concentration less than the maximum diluent concentration ensures an acceptably low risk that the polymer resin in the reactor with the at least one condensable diluent gas will reach a condition of limiting stickiness; and (c) in on-line fashion, determining whether the maximum diluent concentration is less than an unconstrained optimal diluent concentration for performing the reaction with a desired production rate but without constraint against reaching the condition of limiting stickiness, identifying the unconstrained diluent concentration as an optimal diluent concentration in the reactor if the unconstrained diluent concentration is less than the maximum diluent concentration, and identifying the maximum diluent concentration as the optimal diluent concentration in the reactor if said unconstrained diluent concentration is not less than said maximum diluent concentration.

Typically, the at least one condensable diluent gas is an induced condensing agent (ICA), the maximum diluent concentration is a maximum concentration of the ICA, and the optimal diluent concentration is an optimal concentration of the ICA. Alternatively, the at least one condensable diluent gas is or includes a non-ICA diluent.

Preferably, steps (a), (b), and (c) are performed repeatedly during the reaction, with at least one repetition performed per time T, where T is a time interval during which concentration of each condensable diluent gas in the reactor does not change significantly. Typically, T is on the order of a minute during a polyethylene polymerization reaction. In this way, the most recently determined values of maximum diluent concentration and optimal diluent concentration are consistent with current concentration(s) of condensable diluent gas in the reactor.

In some embodiments, the maximum diluent (e.g., ICA) concentration determined in step (b) is the maximum diluent concentration in the reactor inconsistent with bed temperature in the reactor reaching the reduced melt reference temperature in the presence of the at least one condensable diluent gas. In some embodiments, the maximum diluent (e.g., ICA) concentration determined in step (b) is the maximum diluent concentration in the reactor inconsistent with skin temperature in the reactor reaching the reduced melt reference temperature in the presence of the at least one condensable diluent gas.

The method optionally includes the steps of determining a stickiness control parameter (e.g., a dMRT value at least substantially equal to $Trx-MRT_R$, where Trx is the current reactor temperature) from the reduced melt reference temperature. Optionally also, the method includes the step of controlling the reaction in response to the stickiness control parameter in an effort to prevent occurrence of a discontinuity event or production rate constraint.

In some embodiments, the unconstrained optimal diluent (e.g., ICA) concentration is predetermined; not determined in on-line fashion. In other embodiments, the inventive method includes a step of determining the unconstrained optimal diluent concentration in on-line fashion.

Optionally, the method also includes at least one of the following steps: controlling the reaction to achieve a desired (e.g., maximized) production rate by controlling diluent (e.g., ICA) concentration in the reactor to be at least substantially equal to the optimal diluent (e.g., ICA) concentration (to prevent the occurrence of sheeting or another discontinuity event as well as achieving the desired production rate); and controlling the reaction (e.g., by controlling at least one of bed temperature and skin temperature in the reactor or by controlling another monitored reaction parameter) to prevent said at least one of bed temperature and skin temperature from reaching the reduced melt reference temperature.

Preferred embodiments of the inventive method monitor a polymer resin-producing polymerization reaction in a fluid bed reactor to generate, in on-line fashion, data indicative of the imminent occurrence of a discontinuity event or production rate constraint, and preferably also control the reaction in an effort to prevent the occurrence of the discontinuity event or production rate constraint.

In some embodiments, the monitoring data generated in step (a) are indicative of reactor temperature and at least one resin property of the polymer resin, as well as concentration of at least one condensable diluent gas in the reactor. A monitored resin property of the polymer resin can be used to determine the dry melt reference temperature (or dry melt initiation temperature) for the resin being produced.

In a class of preferred embodiments, the dry melt reference temperature is a dry melt initiation temperature, the reduced melt reference temperature determined in step (b) is a reduced melt initiation temperature, and step (b) includes the step of determining the reduced melt initiation temperature in on-line fashion in accordance with a melt initiation temperature depression model for the reaction assuming reaction conditions indicated by the monitoring data, where the melt initiation temperature depression model identifies an estimated degree of depression of the dry melt initiation temperature due to presence of at least one diluent with the polymer resin. The maximum diluent (e.g., ICA) concentration is determined to be a greatest diluent concentration inconsistent with reactor temperature reaching the reduced melt initiation temperature in the presence of the at least one condensable diluent gas whose concentration is indicated by the monitoring data. In typical embodiments in this class, the melt initiation temperature depression model implements the well-known Flory melt depression equation. Some embodiments in this class include the steps of determining from the reduced melt initiation temperature a stickiness control parameter (e.g., a dMIT value at least substantially equal to $Trx-MIT_R$, where Trx is the current value of reactor temperature and $MIT_R$ is the reduced melt initiation temperature). Optionally, the method also includes the step of controlling the reaction in response to the stickiness control parameter in an effort to prevent occurrence of a discontinuity event or production rate constraint.

The MIT and MRT applications cited above disclose methods and systems for on-line generation of data indicative of imminent occurrence of limiting resin stickiness in the fluidized bed, which if left unchecked could lead to sheeting or other discontinuity events in the reactor. An aspect of the present invention is a reaction monitoring system that incorporates any of these methods for monitoring resin stickiness while optimizing induced condensing agent concentration. A temperature value indicative of resin stickiness (dMIT or dMRT) determined in the manner described in the MIT or MRT application, and/or an induced condensing agent concentration value corresponding to such temperature value, may be used in accordance with the present invention as a parameter to control resin stickiness in a fluidized bed polymerization reactor.

Preferred embodiments of the inventive method determine and use a reduced melt reference temperature (e.g., reduced melt initiation temperature) to perform reaction control with improved ability to predict whether a set of monitored reaction parameters (including diluent concentration) is likely to cause or allow resin in the reactor to reach a condition of limiting stickiness. Some conventional reaction control systems can be modified to implement embodiments of the inventive method to determine in real time a stickiness control parameter (e.g., dMRT or dMIT value) and limits thereon to prevent resin stickiness, and alert operators automatically of excursions of the stickiness control parameter beyond a limiting value (e.g., a dMRT or dMIT limit) to prevent or limit process continuity upsets. Such modified control systems can also use results of dMRT or dMIT calculations to provide a maximum diluent (e.g., ICA) stickiness limit input to a diluent (e.g., ICA) optimization routine, resulting in improved reactor throughput and raw material efficiency.

In some embodiments, the inventive method includes the step of monitoring concentration of at least one condensable diluent (e.g., at least one induced condensing agent (ICA), at least one comonomer, at least one isomer of a comonomer, and/or a combination of two or more of such diluents) present in a reactor with polymer resin being produced. For example, the method can use a conventional process gas chromatography to determine the gas phase concentrations of each diluent. The method can also use a "virtual analyzer" to monitor (in on-line fashion) concentration of at least one diluent gas present in the reactor with the polymer resin being produced. The virtual analyzer typically implements unsteady-state mass balance calculations based on data indicative of the feed rates of comonomer and ICA to the reactor and their rates of loss from the reactor, to provide estimates of the gas phase concentrations of both components (e.g., to provide a back-up to a process gas chromatograph or other "real" process analyzers in use). Use of a virtual analyzer would typically be especially important during reactor start-ups and transitions with metallocene catalysts, since during these operations, gas phase concentrations of comonomer and ICA (e.g., hexene and isopentane) can change rapidly with time, in some cases faster than the response time of typical process gas chromatographs. In response to the output of the described virtual analyzer, reaction control could be performed to prevent undesired excursions in diluent concentration (e.g., excursions to high comonomer concentrations) that could lead to resin stickiness and/or dome sheeting.

In some embodiments, at least one high speed skin thermocouple is used to generate the recited monitoring data. A high speed thermocouple can sense reactor temperature excursions of shorter duration than can a conventional thermocouple.

In a class of preferred embodiments, relevant monitoring data from all reaction monitoring instruments, and relevant calculated parameters, are combined into an integrated computer display for presentation to users (e.g., plant operators), and/or are used to perform closed loop control (e.g., automatic, computer-implemented, closed loop control of the reaction without specific user intervention, e.g., to maintain an optimal diluent concentration and avoid a discontinuity event or unacceptably low production rate). Such a computer display can be supplemented by process alarms or advisory notices to warn the users of conditions in the process that may be approaching those that will lead to sheeting (e.g., wall or dome sheeting) or other discontinuity events or production rate constraints. The alarms or advisory notices can also be combined with recommended control actions to avoid a discontinuity event or production rate constraint. For example, in response to the approach of a calculated stickiness control value dMIT (of the type described above) to a limiting value or range (e.g., 6 to 8° C.), an advisory could be generated with a recommendation to reduce (or a closed loop control response that reduces) the reactor temperature and/or isopentane concentration to avoid excessive resin stickiness and the resulting dome sheeting.

In alternative embodiments, the invention is a method for monitoring a polymer resin-producing polymerization reaction in a fluid bed reactor, where a dry melt reference temperature is characteristic of melting behavior of a dry version of the polymer resin, said method including the steps of:

(a) monitoring the reaction to generate monitoring data indicative of at least one parameter of the reaction, including a concentration of at least one condensable diluent gas in the reactor;

(b) determining in on-line fashion a limiting value of diluent concentration in the reactor for performing the reaction with acceptably low risk that the polymer resin in the reactor will reach a condition of limiting stickiness, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the limiting value of diluent concentration an extremum (maximum or minimum) value of the diluent concentration inconsistent with reactor temperature reaching the reduced melt reference temperature in the presence of the at least one condensable diluent gas; and (c) in on-line fashion, comparing the limiting value of diluent concentration with an unconstrained optimal value of diluent concentration for performing the reaction with a desired production rate but without constraint against reaching the condition of limiting stickiness, and identifying one of the limiting value and the unconstrained optimal value as an optimal value of diluent concentration as a result of the comparison. For example, step (c) may include steps of determining whether the limiting value of diluent concentration is less than the unconstrained optimal value of diluent concentration, identifying the unconstrained optimal value as the optimal value if the unconstrained optimal value is less than the limiting value of diluent concentration, and identifying the limiting value as the optimal value if said unconstrained optimal value of diluent concentration is not less than said limiting value. The limiting value of diluent concentration can be a limiting value of a reaction parameter other than ICA concentration (e.g., it can be a limiting value of concentration in the reactor of a comonomer, an isomer of a comonomer, or another non-ICA diluent). In some embodiments, the limiting value of diluent concentration is a limiting value of concentration in the reactor of an ICA.

BRIEF DESCRIPTION OF THE DRAWINGS

FIG. 1 is a simplified cross-sectional view of a reaction system, including fluidized bed reactor 10, whose operation can be monitored and optionally also controlled in accordance with the invention.

FIG. 2 is a block diagram of some elements of the system of FIG. 1 and additional elements for implementing a process for calculating the control variables $MIT_R$ and dMIT. These parameters may be calculated using on-line data from the reaction system and used to provide a real-time estimate of the degree of resin stickiness in the fluidized bed.

FIG. 3 is a first melt Differential Scanning Calorimeter (DSC) melting curve generated from measured data for the polymer and catalyst listed in Row 6 of Table 1. (The term "first melt" refers to DSC melting data obtained on a sample that has not previously been melted, as further described below.) A dry MIT value of 97.4° C. was determined from the initial inflection point of the DSC curve as shown in the figure.

FIG. 4 is the DSC curve of FIG. 3 and another first melt DSC curve that shows the effect of dissolved hydrocarbons in displacing (or "depressing") the DSC melting curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory melt depression equation.

FIG. 5 is a displaced first melt DSC curve with indications that illustrate a calculation of the control variable dMIT as the difference between the reactor temperature (Trx) and the shifted (or displaced) value of the melt initiation temperature $MIT_R$.

DETAILED DESCRIPTION

A reactor system whose operation may be monitored and optionally controlled in accordance with the invention will be described with reference to FIGS. 1 and 2. The system of FIG. 1 includes fluidized bed reactor 10. Reactor 10 includes bottom end 11, top expanded (or "dome") section 19 (composed of a cylindrical transition section and a hemispherical top head of the reactor), cylindrical (straight) section 14 between bottom end 11 and expanded section 19, and distributor plate 12 within section 14. A fluidized bed 5 of granular polymer and catalyst particles is contained within straight section 14. The bed is fluidized by a steady flow of recycle gas through the distributor plate 12. The flow rate of fluidizing gas is regulated to provide the fluidized bed with relatively good mixing, as illustrated in the figure.

The reactor system also has a catalyst feeder 9 for controlled addition of polymerization catalyst to the fluidized bed reaction zone. Within the reaction zone (i.e. the fluidized bed), the catalyst particles react with the ethylene, comonomer, and optionally hydrogen and other reaction gases to produce granular polymer particles. As new polymer particles are produced, other polymer particles are continually withdrawn from the fluidized bed through a product discharge system 20. After passing through the product discharge system, the polymer granules are degassed (or "purged") with a flow of inert nitrogen to remove substantially all of the dissolved hydrocarbon materials.

The reactor system of FIG. 1 also has a cooling control loop which includes recycle gas line 31, cycle gas cooler 30, and compressor 32, coupled with reactor 10 as shown. During operation, the cooled circulating gas from cooler 30 (which may contain condensed liquid) flows through inlet 34 into reactor 10, then propagates upward through the bed and out from reactor 10 via outlet 33. The cooler 30 is preferably positioned downstream of compressor 32 (as shown in FIG. 1), but in some embodiments may be positioned upstream of compressor 32.

The expanded section 19 is also known as the "velocity reduction zone" or "disengagement zone", and is designed to minimize the quantities of particle entrainment from the fluidized bed. The diameter of each horizontal cross-section of the expanded section 19 is greater than the diameter of straight section 14. The increased diameter causes a reduction in the speed of the fluidizing gas, which allows most of the entrained resin particles to settle back into the fluidized bed, thereby minimizing the quantities of solid particles that are entrained (or "carried over") from the fluidized bed (at a given value of fluidizing gas velocity) through the recycle gas line 31.

One or more bed temperature sensors 16 are located in the fluidized bed, and are used with a control system (not shown in FIG. 1 but which can include processor 50 of FIG. 2) and an external cooling loop coupled to the heat exchanger 30 to control the fluidized bed temperature Trx near the process set-point. Relatively warm reactor gas (which obtains a temperature substantially equal to that of the fluidized bed during its flow through reactor 10) is withdrawn from outlet 33 and is pumped by compressor 32 to cooler 30, wherein the temperature of the gas (the cooling fluid) is reduced. Relatively cool fluid (which may contain condensed liquid) flows out from cooler 30 to the reactor inlet 34, to cool the fluidized bed. Temperature sensors (not shown) near the inlet and outlet of cooler 30 provide feedback to the control system regulate the amount by which cooler 30 reduces the temperature of the fluid entering reactor.

The FIG. 1 system also includes a number of "skin temperature" sensors 8 (typically implemented as thermocouple sensors having fast response design), mounted in positions along straight section 14 of the reactor wall (and optionally also the conical portion of the expanded section 19) so as to protrude from the wall a short distance into the reactor (e.g., 3 to 12 mm). Sensors 8 are configured and positioned to sense the temperature $T_w$ of the resin and/or reactor gas near the wall of reactor 10 during operation. A rise in temperature readings from these sensors (e.g. a rise in temperature of 3 to 20° C. from their steady-state readings) provides an indication that a fused polymer sheet is currently forming at that location. However, these sensors provide a coincident indication of a sheeting event or other discontinuity event, rather than providing an early warning of an impending sheeting event or other discontinuity event.

Preferably, skin temperature sensors 8 of FIG. 1 are high speed skin thermocouples. A high speed thermocouple can sense reactor temperature excursions of shorter duration than can a conventional thermocouple. Detection of such short duration temperature excursions can be necessary to generate reaction parameter data or to determine monitored reaction parameters that are useful to perform typical embodiments of the inventive method. The expression "high speed" (or "fast") thermocouple is used herein to denote a thermocouple implemented to have sufficiently fast response to be sensitive to temperature spikes of duration, for example, less than ten seconds when positioned not more than 12 mm from the reactor wall, or a thermocouple whose response has a time, for example, constant of not more than one second (and preferably not more than four seconds) using still water as the reference fluid in responding to a step change in water temperature from 1 to 100° C.

In particular, a high speed thermocouple may be implemented as a conventional two-wire thermocouple junction (the sensing element) contained within a thin metal sheath of 0.125 to 0.250 inches diameter. The metal sheath, with the contained thermocouple, is inserted into the reactor through a suitable sealing gland to provide the required pressure seal to prevent loss of gas from the reactor. The high speed thermocouples are preferably positioned as "skin" temperature sensors (described above), with the tips of the sensors (containing the sensing element) extending into the fluid bed a distance, for example, of 3 to 12 mm. Suitable high speed thermocouples and sealing glands are commercially available from, for example, Conax Buffalo Technologies, Buffalo, N.Y.

The one or more bed temperature sensors 16 in the fluidized bed can include at least one resistance temperature sensor positioned and configured to sense bed temperature during reactor operation at a location within reactor 10 away from the reactor wall. The resistance temperature sensor can be mounted so as to protrude into the bed more deeply than do sensors 8 (e.g., 20 to 50 cm away from the reactor wall).

In some embodiments of the present invention, sensors of the type shown in FIGS. 1 and 2 are employed to monitor reaction parameters during a polymerization reaction. In other embodiments of the present invention, other sensors and optionally also other apparatus are employed to monitor the same parameters or other reaction parameters during a polymerization reaction. Such other reaction parameters can include instantaneous and bed-averaged resin product properties (e.g., melt index and density of the polymer resin product being produced by the FIG. 1 system during a polymerization reaction). Bed-averaged resin product properties are conventionally measured by periodically sampling the resin as it exits the reactor (e.g. once per hour), and performing the appropriate tests in a quality control laboratory. Instantaneous product properties are conventionally determined by calculation methods (known in the art) based on reaction models specific to the particular catalyst in use. The reaction models typically relate gas phase concentration ratios (e.g. the 1-hexene/ethylene molar ratio and the hydrogen/ethylene molar ratio) to the instantaneous density and melt index of the polymer being produced.

Reaction parameters monitored in accordance with embodiments of the invention can include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatographic system 40.

It is known how to regulate process variables to control various steady-state reactions performed by the FIG. 1 system (e.g., to control gas phase composition, the concentration of induced condensing agents (ICAs), partial pressure of at least one reactant (e.g., ethylene), and the type and properties of each catalyst introduced into reactor 10, and to use elements 30 and 32 in the manner described above to control temperature). It is also known how to control a polymerization reaction during a transition by regulating process control variables such that the product (granular polymer resin) has properties compliant with an initial specification set at the start of the transition; the product produced during the transition ceases to comply with the initial specification set at a first time, and the product has properties compliant with a final specification set at the end of the transition.

In typical embodiments of the invention, a reaction (e.g., a steady-state reaction and/or a reaction transition) performed in a polymerization reactor is controlled by adjusting or regulating a process variable (e.g., ICA concentration or bed or skin temperature) within a limiting range determined in accordance with the invention using a reduced melt initiation temperature, $MIT_R$, or a reduced melt reference temperature, $MRT_R$, or a parameter (e.g., dMIT or dMRT value) determined by the reduced melt initiation temperature or reduced melt reference temperature. Each such control variable is determined based on the output of at least one sensor that measures reaction parameters. Processor 50 of FIG. 2 is an example of a processor programmed to generate one or more of such control variables in on-line fashion in accordance with any embodiment of the invention in response to monitored reaction parameters (e.g., parameters indicated by the output of temperature sensor 16 or sensor 8 of FIG. 1 and the output of process gas chromatograph 40, and/or resin density or MI or other resin properties or process parameters otherwise measured or calculated during the reaction), and to control the reaction in response to each control variable. Processor 50 may be a separate, stand alone processor (or DCS or supervisory control system), or it may be integral with other process control computers of a type used conventionally to monitor and control the reactor system.

Preferably, processor 50 is configured and programmed to combine relevant measured data from all reaction monitoring instruments and relevant calculated parameters and control variables into an integrated computer display for presentation to users (e.g., plant operators) and/or to use them to perform closed loop control (e.g., automatic, closed loop control of the reaction without user intervention, e.g., to maintain an optimal diluent concentration and avoid a discontinuity event or unacceptably low production rate). Such a computer display (e.g., display 60 of FIG. 2) can indicate current values of ICA (or other diluent) concentration, $MIT_R$, dMIT, $MRT_R$, and/or dMRT as defined herein, and/or current values of other measured or calculated parameters such as measured bed temperature, bed static, and/or carryover static values, and/or graphical trends of historical data indicative of any such measured or calculated parameter.

The computer display can be supplemented by process alarms or advisory notices to warn the users of conditions in the process that may be approaching those that will lead to sheeting (e.g., wall or dome sheeting) or another discontinuity event or production rate constraint. The alarms or advisory notices can be combined with recommended control actions to avoid a discontinuity event (or production rate constraint) which can be presented to the operators as part of the display 60. For example, in response to the approach of a calculated stickiness control value dMIT (of a type described herein) to a limiting value or range (e.g., 6 to 8° C.) or an approach of ICA concentration to a limiting value, an advisory could be generated and displayed (or otherwise promulgated) with a recommendation to reduce (or a closed loop control response that reduces) the reactor temperature and/or isopentane concentration to avoid excessive resin stickiness and resulting dome sheeting.

In typical embodiments, the invention is a method for monitoring a polymer resin-producing polymerization reaction in a fluid bed reactor (e.g., reactor 10 of FIG. 1). A dry melt reference temperature is characteristic of melting behavior of a dry version of the polymer resin. In these embodiments the method includes steps of:

(a) monitoring the reaction (e.g., using temperature sensors 16 and 8, and process gas chromatograph 40 of FIGS. 1 and 2) to generate monitoring data indicative of at least one parameter of the reaction, including a concentration of at least one condensable diluent gas in the reactor;

(b) determining in on-line fashion a maximum induced condensing agent ("ICA") concentration in the reactor, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the maximum ICA concentration a greatest ICA concentration inconsistent with reactor temperature reaching the reduced melt reference temperature in the presence of the at least one condensable diluent gas; and (c) in on-line fashion, determining whether the maximum ICA concentration is less than an unconstrained optimal ICA concentration (where "unconstrained optimal ICA concentration" here denotes an ICA concentration for performing the reaction with a desired production rate but without constraint against reaching a condition of limiting stickiness), identifying the unconstrained ICA concentration as an optimal ICA concentration in the reactor if the unconstrained ICA concentration is less than the maximum ICA concentration, and identifying the maximum ICA concentration as the optimal ICA concentration in the reactor if said unconstrained ICA concentration is not less than said maximum ICA concentration.

Performing the reaction with ICA concentration less than the maximum ICA concentration ensures an acceptably low risk that the polymer resin in the reactor will reach the condition of limiting stickiness, since reaction performance under this condition is inconsistent with reactor temperature reaching the reduced melt reference temperature under reaction conditions (i.e., presence of the at least one condensable diluent gas) indicated by the monitoring data.

In alternative embodiments, the method determines an optimal diluent concentration (i.e., a concentration of a diluent other than an ICA) rather than an optimal ICA concentration, and each occurrence of "ICA" in the above-specified method is replaced by "diluent."

In some embodiments, the maximum ICA concentration determined in step (b) is the maximum ICA concentration in the reactor inconsistent with bed temperature in the reactor reaching the reduced melt reference temperature in the presence of the at least one condensable diluent gas. In some embodiments, the maximum ICA concentration determined in step (b) is the maximum ICA concentration in the reactor inconsistent with skin temperature in the reactor reaching the reduced melt reference temperature in the presence of the at least one condensable diluent gas.

Preferably, steps (a), (b), and (c) are performed repeatedly during the reaction, with at least one repetition performed per time T, where T is a time interval during which concentration of each condensable diluent gas in the reactor does not change significantly. Typically, T is on the order of a minute during a polyethylene polymerization reaction. With such repetition, the most recently determined values of maximum ICA concentration and optimal ICA concentration are consistent with current concentration(s) of condensable diluent gas in the reactor.

The method optionally includes the steps of determining a stickiness control parameter (e.g., a dMRT value at least substantially equal to Trx−$MRT_R$, where Trx is the current value of reactor temperature) from the reduced melt reference temperature. Optionally also, the method includes the step of controlling the reaction in response to the stickiness control parameter.

In some embodiments, the unconstrained optimal ICA concentration is predetermined (e.g., in a manner described in above-cited U.S. Patent Application Publication No. 2007/0043174 A1) rather than being determined in on-line fashion. In other embodiments, the inventive method includes a step of determining the unconstrained optimal ICA concentration (e.g., as described in U.S. Patent Application Publication No. 2007/0043174 A1) in on-line fashion in response to the monitoring data.

In some embodiments, the method also includes a step of:

(d) controlling the reaction to achieve a desired (e.g., maximized) production rate by controlling ICA concentration in the reactor to be at least substantially equal to the optimal ICA concentration. As a result, the reaction is controlled to prevent the occurrence of a discontinuity event (e.g., sheeting) as well as to achieve the desired production rate. For example, ICA concentration during a polymerization reaction may be controlled to reach and remain at a value that is determined to be optimal in accordance with the invention, but which is higher than had been typical (prior to practice of the present invention). In the latter example, the reactor temperature may also be lower than had been typical, and the ICA concentration (while higher than typical) is controlled to be sufficiently low to ensure an acceptably low risk that the polymer resin in the reactor with condensable diluent gas will reach a condition of limiting stickiness.

In some embodiments, the method also includes a step of:

(d) controlling the reaction (e.g., by controlling at least one of bed temperature and skin temperature in the reactor or by controlling another monitored reaction parameter) to prevent at least one of bed temperature and skin temperature from reaching the reduced melt reference temperature. These embodiments optionally also include a step of controlling the reaction to achieve a desired (e.g., maximized) production rate by controlling ICA concentration in the reactor to be at least substantially equal to the optimal ICA concentration.

Preferred embodiments of the inventive method monitor a polymer resin-producing polymerization reaction in a fluid bed reactor to generate, in on-line fashion, data indicative of the imminent occurrence of a discontinuity event or production rate constraint, and preferably also control the reaction in an effort to prevent the occurrence of the discontinuity event or production rate constraint.

In some embodiments, the monitoring data generated in step (a) are indicative of reactor temperature and at least one resin property of the polymer resin, as well as concentration of at least one condensable diluent gas in the reactor. A monitored resin property of the polymer resin can be used to determine the dry melt reference temperature (or dry melt initiation temperature) for the resin being produced.

In a class of preferred embodiments, the reduced melt reference temperature determined in step (b) is a reduced melt initiation temperature, the dry melt reference temperature is a dry melt initiation temperature, and step (b) includes the step of determining the reduced melt initiation temperature in on-line fashion in accordance with a melt initiation temperature depression model for the reaction assuming reaction conditions indicated by the monitoring data, said melt initiation temperature depression model identifying an estimated degree of depression of the dry melt initiation temperature due to presence of at least one diluent with the polymer resin. The maximum ICA concentration is determined to be a greatest ICA concentration inconsistent with reactor temperature reaching the reduced melt initiation temperature in the presence of the at least one condensable diluent gas whose concentration is indicated by the monitoring data. In typical embodiments in this class, the melt initiation temperature depression model implements the well-known Flory melt depression equation. For example, after using the model (assuming monitored values of reaction temperature and ICA concentration) to determine the reduced melt initiation temperature, the same model can be used to determine a greatest ICA concentration inconsistent with reactor temperature reaching the reduced melt initiation temperature. Specifically, this greatest ICA concentration is the ICA concentration determined by application of the model assuming that reaction temperature is the reduced melt initiation temperature or a temperature related to and determined by the reduced melt initiation temperature (e.g., a temperature less than the reduced melt initiation temperature by a predetermined amount) and reaction conditions (other than ICA concentration and reaction temperature) are as indicated by the monitoring data. Some embodiments in this class include the steps of determining from the reduced melt initiation temperature a stickiness control parameter (e.g., a dMIT value at least substantially equal to $Trx-MIT_R$, where Trx is the current value of reactor temperature and $MIT_R$ is the reduced melt initiation temperature). Optionally, the method also includes the step of controlling the reaction in response to the stickiness control parameter.

The MIT and MRT applications cited above disclose methods and systems for on-line generation of data indicative of imminent occurrence of limiting resin stickiness in the fluidized bed, which if left unchecked could lead to sheeting or other discontinuity events in the reactor. An aspect of the present invention is a reaction monitoring system that incorporates (e.g., is configured with sensors and includes a processor programmed to perform) any of these methods for monitoring resin stickiness while also optimizing induced condensing agent concentration. A temperature value indicative of resin stickiness (dMIT or dMRT) determined in the manner described in the MIT or MRT application, and/or an induced condensing agent concentration value corresponding to such temperature value, may be used in accordance with the present invention as a parameter to control resin stickiness in a fluidized bed polymerization reactor.

Preferred embodiments of the inventive method determine and use a reduced melt reference temperature (e.g., reduced melt initiation temperature) to perform reaction control with improved ability to predict whether a set of monitored reaction parameters (including ICA concentration) is likely to cause or allow resin in the reactor to reach a condition of limiting stickiness. Some conventional reaction control systems can be modified to implement embodiments of the inventive method to determine in real time a stickiness control parameter (e.g., dMRT or dMIT value) and limits thereon to prevent resin stickiness, and alert operators automatically of excursions of the stickiness control parameter beyond a limiting value (e.g., a dMRT or dMIT limit) to prevent or limit process continuity upsets. Such modified control systems can also use results of dMRT or dMIT calculations to provide a maximum ICA stickiness limit input to an ICA optimization routine, resulting in improved reactor throughput and raw material efficiency.

In some embodiments, the inventive method includes the step of monitoring concentration of at least one condensable diluent (e.g., at least one induced condensing agent (ICA), and at least one comonomer or at least one isomer of a comonomer, or a combination of all or some such diluents) present in a reactor with polymer resin being produced. For example, the method can use conventional process gas chromatography (e.g., using a gas chromatographic system such as system 40 of FIGS. 1 and 2) to determine the gas phase concentrations of each diluent. Also, or alternatively, a "virtual analyzer" can be used to monitor (in on-line fashion) concentration of at least one diluent gas present in the reactor with the polymer resin being produced. The virtual analyzer would typically implement unsteady-state mass balance calculations based on data indicative of the feed rates of comonomer and ICA to the reactor and their rates of loss from the reactor, to provide estimates of the gas phase concentrations of both components (e.g., to provide a back-up to a process gas chromatograph or other "real" process analyzers in use). Use of a virtual analyzer would typically be especially important during reactor start-ups and transitions with metallocene catalysts, since during these operations, gas phase concentrations of comonomer and ICA (e.g., hexene and isopentane) can change rapidly with time, in some cases faster than the response time of typical process gas chromatographs. In response to the output of the described virtual analyzer, reaction control could be performed to prevent undesired excursions in diluent concentration (e.g., excursions to high comonomer concentrations) that could lead to resin stickiness and/or dome sheeting.

In some embodiments, at least one high speed skin thermocouple is used to generate at least some of the recited monitoring data. A high speed thermocouple can sense reactor temperature excursions of shorter duration than can a conventional thermocouple.

In some embodiments, the inventive method includes steps of:

(a) monitoring a polymerization reaction which produces a polymer resin in a fluid bed reactor (e.g., reactor 10 of FIG. 1), where the polymer resin has a dry melt reference temperature, and the dry melt reference temperature (sometimes referred to herein as a "dry MRT") is a temperature characteristic of melting behavior of a dry version of the polymer resin; and (b) in response to data indicative of at least one monitored parameter of the reaction (including concentration of at least one condensable diluent gas in the reactor), determining in on-line fashion a reduced melt reference temperature (sometimes referred to herein as "$MRT_R$") characteristic of the melting behavior of the polymer resin as it exists in the reactor. The reduced melt reference temperature ("$MRT_R$") is a temperature characteristic of melting behavior of the polymer resin the presence of the at least one condensable diluent gas with the resin in the reactor, and is at least substantially equal to the difference between the dry MRT and a melt reference temperature depression value, "D," where D is a temperature by which the dry MRT is depressed by the presence of the at least one condensable diluent gas with the resin. In some embodiments, the method also includes the step of determining a stickiness monitoring and control parameter from the reduced melt reference temperature. Typically, the stickiness monitoring and control parameter (sometimes referred to herein as a "ΔMRT" value) is a temperature value indicative of the degree of resin stickiness, and is at least substantially equal to $Trx-MRT_R$, where Trx is current reactor temperature.

Some such embodiments of the inventive method also include the step of controlling the reaction in response to the reduced melt reference temperature or stickiness monitoring and control parameter (e.g., in response to a ΔMRT value), for example by maintaining bed temperature in a predetermined relation with (e.g., below) the reduced melt reference temperature or a temperature (or temperature range) related to the reduced melt reference temperature.

The dry MRT is any distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample (for example, a Seal Initiation Temperature as described in U.S. Pat. No. 7,122,607);

a resin Hot Tack Initiation Temperature (for example, a Hot Tack Initiation Temperature as described in U.S. Pat. No. 7,122,607);

a dry sticking temperature of granular polymer in a fluid bed (for example, a dry sticking temperature as described in U.S. Pat. No. 7,122,607);

a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction; or a dry Melt Initiation Temperature (MIT) determined (e.g., graphically) as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith).

Below (with reference to FIGS. 3-5 and Equations 1-15), we describe exemplary embodiments in which the dry MRT is a dry melt initiation temperature ("dry MIT") determined graphically as the onset of rapid melting in a first or second melt DSC curve determined from a DSC measurement on a dry sample of polymer resin of the type being produced.

FIG. 3 shows a first melt DSC curve generated from measured data for the polymer listed in Row 6 of Table 1 (produced by polymerization using the catalyst listed in Row 6 of Table 1). Table 1 is set forth below. The dry melt initiation temperature, dry MIT, is taken as the point of rapid onset of melting. Quantitative values may be obtained graphically as the intersection of the two tangent lines as shown. For this particular polymer, the peak melting temperature was determined 116.1° C., and the dry MIT was determined as 97.4° C.

FIG. 4 illustrates the effect of dissolved hydrocarbons in shifting (or "displacing" or "depressing") the polymer melt curve. The effect of these dissolved components, principally dissolved ICA, comonomer and isomers of the comonomer, is assumed in the present work to displace the entire melt curve (shown in FIG. 3 and also shown as a dashed curve in FIG. 4) towards lower temperatures, resulting in the displaced curve indicated in FIG. 4. The polymer peak melting temperature is displaced downwards, along with the MIT. The amount of displacement is denoted as D (in units of temperature, ° C.), and is calculated using the Flory melt depression equation and appropriate data (or correlations) for the solubility of condensable hydrocarbons in the polymer. The displaced value of MIT is denoted as $MIT_R$.

FIG. 5 illustrates a calculation of the stickiness monitoring and control parameter dMIT. This is computed as $dMIT=TX-MIT_R$, and represents the extent by which the reactor bed temperature exceeds (or "overlaps") the displaced value of the MIT. The physical units of dMIT are in units of temperature, ° C. The dMIT incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of dMIT correspond to limiting values of stickiness, and may be different for different catalyst systems. For polymers produced with Catalyst A (a metallocene catalyst described below) the limiting value of dMIT was determined to be in the range of 6 to 8° C.

Embodiments of the present invention determine an estimated degree of depression of a dry MIT (or, more generally, a dry melt reference temperature) for a polymer resin due to presence of at least one diluent (e.g., ICA, comonomer, and at least one isomer of the comonomer) with the resin in a reactor during a polymerization reaction, from at least one parameter of the reaction measured on an on-line basis and using a predetermined melt initiation temperature depression model based on the Flory melt depression equation. As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near to (or below) the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. The model (sometimes referred to herein as a melt initiation temperature depression model or MIT depression model) can be readily programmed into a stand-alone computer or a conventional plant DCS (or supervisory control) system to provide on-line monitoring and/or control of combinations of process conditions that lead to resin stickiness. This provides for the ability to adjust reactor conditions to avoid excessive stickiness (i.e., to avoid limiting values of dMIT) and thereby reduce the likelihood of sheeting incidents or reduced production throughput.

In a class of embodiments, the method includes the steps of: determining a dry melt initiation temperature for polymer resin being produced, preferably by characterizing a DSC (differential scanning calorimetry) melting curve for a dry version of the resin being produced; and estimating the amount by which the dry melt initiation temperature is depressed due to the presence of the condensable diluent component(s) actually present with the resin being produced in the reactor. In characterizing such a DSC melting curve, an inflection point in the DSC melting curve is typically identified as the dry melt initiation temperature (MIT). Using the Flory melt depression equation, these embodiments determine a reduced melt initiation temperature ($MIT_R$) at which the resin in the reactor will begin to melt in the presence of the condensable diluent gas or gases (e.g., soluble hydrocarbons) that are present with the resin during the reaction. The reduced melt initiation temperature, $MIT_R$, is at least substantially equal to MIT−D, where MIT is the dry melt initiation temperature, and D is an estimated degree of MIT depression, caused by the highly soluble diluent gas components in the reactor.

The methodology for estimating the depression D of the dry melt initiation temperature is based on the Flory melt depression equation and existing models for vapor solubility in the polymer resin. The noted embodiments typically determine a single calculated parameter, dMIT, which is the difference between the reactor temperature, Trx, and $MIT_R$, to quantify the degree to which the reactor temperature overlaps the (depressed) melting curve, and thus quantify the degree of resin stickiness.

The expression "DSC melting curve" for a dry polymer resin herein denotes an experimentally determined relationship between the rate at which heat is absorbed by a sample of the dry resin (e.g., in units of mW/g) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sampled is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

Some embodiments of the inventive method that employ a melt initiation temperature depression model (e.g., one based on and implementing the Flory melt depression equation) include the steps of:

(a) during a polymerization reaction in a fluid bed reactor which produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

(b) determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

(c) during the reaction, using a melt initiation temperature (MIT) depression model to determine in on-line fashion a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory melt depression equation; and (d) determining in on-line fashion a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Typically, the reduced melt initiation temperature determined in step (c) is a temperature ($MIT_R$) above which resin in the reactor (in the presence of condensable diluent gas) is predicted to begin to melt. In some embodiments, the temperature value generated in step (d) is a temperature value, dMIT, which is at least substantially equal to $Trx-MIT_R$, where Trx is the current reactor temperature, and $MIT_R$ is the reduced melt initiation temperature determined in step (c). Typically, $MIT_R$ is at least substantially equal to MIT–D, where MIT ("melt initiation temperature") is the dry MIT value determined in step (b), D is an estimated degree of MIT depression due to the presence of the at least one condensable diluent gas with the resin in the reactor. In other embodiments, the temperature value generated in step (d) is a temperature value otherwise indicative of the degree of resin stickiness in the fluid bed.

Preferably, steps (a)-(d) are performed repeatedly (e.g., on an ongoing basis) during the reaction to generate a sequence of temperature values indicative of resin stickiness in the reactor (e.g., a sequence of values of dMIT or data indicative of a time-varying value of dMIT), and the method also includes the step of:

(e) controlling the reaction to maintain (or attempt to maintain) resin stickiness in the reactor in a predetermined relationship with a predetermined limiting value or range of values (e.g., to maintain a current value of dMIT in a predetermined relationship with a predetermined limiting temperature value or range of values).

For some embodiments in which the reaction controlled in step (e) is a polyethylene polymerization reaction using a metallocene catalyst to be referred to as Catalyst A (described below), and the temperature value generated in step (d) is a stickiness monitoring and control parameter dMIT which is at least substantially equal to $Trx-MIT_R$. Such a temperature value dMIT has been correlated with measured data characterizing the same type of polyethylene polymerization reaction (performed using Catalyst A). The data characterized several wall and dome sheeting incidents that occurred during the reaction, as well as normal operation that occurred without sheeting. The correlation determined that when the dMIT value exceeded a limiting value (determined to be in the range 6° C. to 8° C.), the likelihood of dome sheeting increased significantly. The correlation also determined that maintaining the dMIT value below this limiting value is critical to avoid dome sheeting during a reaction of the type analyzed. Thus, in these embodiments, step (e) preferably maintains (or attempts to maintain) the reaction parameters so that dMIT is in a predetermined limiting range from 5° C. to 6° C. (or less than a predetermined limiting value from 6° C. to 8° C.).

For some other polyethylene polymerization reactions using a catalyst other than above-noted Catalyst A, the temperature value generated in step (d) is a stickiness monitoring and control parameter dMIT which is at least substantially equal to $Trx-MIT_R$), and step (e) maintains (or attempts to maintain) the reaction parameters so that dMIT is in a predetermined limiting range which is found (in commercial experience) to be appropriate for that catalyst. With these other catalyst systems the range of dMIT values required to avoid excessive resin stickiness may be different than 6° C. to 8° C. The limiting dMIT values (or range of values) for these catalysts are taken as those that are found to correlate with discontinuity events or limiting stickiness constraints (sheeting, chunking and/or rapid fouling of the distributor plate or cycle gas cooler) with the particular catalyst in a commercial reactor system.

We next describe an example of performance of step (c) to determine a reduced melt initiation temperature, assuming that a dry melt initiation temperature value has been determined in step (b). In light of thermodynamic considerations, the presence of a soluble, condensable substance (e.g., a hydrocarbon) reduces the melting temperature of a polymer. A relationship, known as the Flory melt depression equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi\phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.),
$T_m^0$ is the peak melting temperature of the polymer without diluent (° C.),
$\Delta Hu$ is the enthalpy of fusion for the polymer repeat unit (850.6 cal/mol),
$\phi_1$ is the volume fraction of diluent (single or multi-component), and
$\chi$ is a binary interaction parameter, the parameter $\chi$ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:
$\delta_1$ is the solubility parameter of the diluent, and
$\delta_2$ is the solubility parameter of the polymer.

For a diluent that is a mixture of gases:

$$\delta_1 = \delta_{mix} = \Sigma \delta_i f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate $\chi$ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs} \cdot (\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m$ is the peak melt temperature expected for the polymer in the presence of the diluent. In light of thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as $$MIT_R = MIT - D \quad (6)$$

In the example, the temperature value generated in step (d) is a temperature value $dMIT = Trx - MIT_R$, where Trx is the current reactor temperature, and $MIT_R$ is given by Equation 6. The value dMIT is the difference between the reactor temperature (Trx) and the melt initiation temperature of the polymer, accounting for the depression in melting point for soluble hydrocarbons. A positive value of dMIT indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:
Kp is the Henry's Law constant,
$\omega$ is an acentric factor,
Tc is the critical temperature of the diluent (° K), and
T is the temperature (° K).

To calculate the vapor solubility, the following equation was presented by Stiel et al., (cited above):

$$Py_1 = Kp \cdot V_1^0 \quad (8)$$

where:
P is the reactor total pressure (atm),
$y_1$ is vapor phase mole fraction, and
$V_1^0$ is vapor solubility in cm$^3$ diluent/g polymer at 273.2° K and 1 atmosphere pressure.

By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where:
Ta is 273.15 (° K),
R is the gas constant (82.06 cm$^3$·atm/mol·° K), and
Mw is the molecular weight of the diluent, or:

$$S = P \cdot Mw \cdot \frac{\exp\left(-1.561 + (2.057 + 1.438\omega)\left(\frac{Tc}{T}\right)^2\right)}{22414.7} \quad (10)$$

If P is in units of bars (rather than atmospheres), the constant in the denominator of Equation 10 is 22710.9.

To calculate the melting point depression by Equation 4, the volume fraction of diluent $\phi$ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho_P}} \quad (11)$$

where:
Ms is the mass fraction of diluent,
$\rho s$ is the density of the diluent (in $g/cm^3$), and
$\rho_1$ is the density of the polymer (in $g/cm^3$)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/Trx} P^e \quad (12)$$

where MI is the polymer melt index, $I_2$ (g/10 min), $\rho$ is the polymer density ($g/cm^3$), Trx is the reactor temperature (in ° K), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left(\left(b1+\frac{b2}{T}-b3\right)P\right)} e^{c/Trx}(1-\rho)^d MI^e \quad (13)$$

where (again) MI is the polymer melt index ($I_2$, g/10 min), $\rho$ is the polymer density ($g/cm^3$), Trx is the reactor temperature (in ° K), P is the hydrocarbon partial pressure at the resin conditions (in psia), and a, b1, c, d, and e are predetermined parameters.

In the example, diluent mixture molar volumes are utilized. Well known methods such as the Rackett method using the Chueh-Prauxnitz mixing rules or the Hankinson-Brobst-Thomson method for mixtures may be applied. Molar volumes used herein were calculated using the modified Rackett method using the Chueh-Prausnitz mixing rules (as described in Reid, R. C., et al., *The Properties of Gases and Liquids*, 4$^{th}$ ed., McGraw-Hill, New York, 1987):

To estimate $\chi$ in Equation 4, the volume fraction of each soluble component is also utilized. In the example, the $\chi$ parameter was computed by modifying Equation 2 as follows:

$$\chi = 0.34 + \frac{V_1}{RT_{rx}}\left(\sum_i \delta_i \frac{S_i}{\sum_i S_i} - \delta_P\right) \quad (14)$$

where:
$\delta_P$ is polymer solubility parameter,
$\delta_i$ is the solubility parameter of diluent component i,
$S_i$ is defined by Equation 10, and
The temperature T is taken as the reactor bed temperature Trx.

In the example, melt DSC measurements were made for a series of polymers (produced with a variety of catalysts) before step (b) was performed. Table 1 shows the melt index (MI) and density ($\rho$) of each polymer, the catalyst employed to produce the polymer (and included with the polymer sample measured), and the melt initiation temperature and peak melt temperature determined for the polymer. The density of the polymers ranged from 0.909 to 0.966 g/cm$^3$ and their melt indices ranged from 0.81 to 19.0 g/10 min. In Table 1 and elsewhere herein polymer density refers to density measured in accordance with ASTM 1505-98. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in WO 99/61486A1, wherein it is also designated as "Catalyst A." WO 99/61486A1 teaches (on page 29) the following method for preparing this catalyst: "Davison grade 948 silica (available from W.R. Grace, Davison Chemical Division, Baltimore, Md.) was dehydrated to 600° C. and used as the support. The dehydrated silica (850 g) was charged into a 2 gallon reactor and 1060 ml of 30 wt % methylaluminoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl) zirconium dichloride was added as a 10 wt % solution in toluene. Reaction time for the bulky ligand metallocene-type catalyst compound was 1 hour after which the catalyst system was dried with $N_2$ under a vacuum. Drying time was 3 hours at 150° F. (66° C.) and at a reduced agitator speed of 30 rpm. A total of 1200 grams of dried free flowing catalyst was isolated."

In Table 1 and elsewhere herein, "Catalyst B" is a metallocene catalyst described in WO 99/61486A1. The catalyst is identified as "Catalyst D" in the publication, and is based on a "bulky ligand metallocene-type catalyst compound", dimethylsilyl-bis(tetrahydroindenyl)zirconium dichloride ($Me_2Si(H_4Ind)_2ZrCl_2$), which is available from Albemarle Corporation, Baton Rouge, La." WO 99/61486A1 teaches (page 32, line 11, to page 33, line 11) the following method for preparing this catalyst: "The ($Me_2Si(H_4Ind)_2ZrCl_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis(tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine ($C_{18}H_{37}N(CH_2CH_2OH)_2$) available as Kemamine AS-990 (from) Witco Corporation, Memphis, Tenn., is added together with an additional 110 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0."

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum (AlEt3) at 60° C. in isopentane, solvent is removed and the resulting product is dried. In the second step, a solution of $MgCl_2$ and $TiCl_3.1/3AlCl_3$ dissolved in THF is mixed at 60° C. with the product formed in the first step, solvent is removed and the resulting product is dried to reduce the THF concentration in the product to the range of 0.13 to 0.15. In the third step, the product formed in the second step is reacted with Et2AlCl and Al(n-hexyl)3 at 60° C. in isopentane, the solvent is removed and the product is dried. The quantity of Et2AlCl used in the third step is such that the molar ratio of Et2AlCl/THF is 0.50. The quantity of Al(n-hexyl)3 used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 3. It is contemplated that in alternative embodiments, a melt initiation temperature (e.g., a dry MIT or other dry MRT) for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. The inflection point of the DSC curve for each polymer is considered to be the dry melt initiation temperature value MIT for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.7524 \ln(MI) - 606.09 \qquad (15)$$

where $\rho$ represents the density of the polymer (in units of g/cc), and MI represents the melt index, $I_2$, of the polymer (in units of dg/min).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e. other than Catalysts A, B or C) may have MIT values that do not fit the regression curve defined by Equation 15. Solubility parameters for these gases were obtained from the *Chemical Properties Handbook* 1999, and are listed in Table 2 below. A value for the of solubility parameter of polyethylene was obtained from an average of several values that are listed for polyethylene in the *Polymer Handbook*, 4th ed.

TABLE 1

| Catalyst | Melt Init. Temp (° C.) | Peak Melt Temp (° C.) | Melt Index (dg/min) | Density (g/cc) |
|---|---|---|---|---|
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

TABLE 2

Solubility Parameters
$((cal/cm^3)^{1/2})$

| | |
|---|---|
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min, and a density of 0.918 g/cc, being produced in a fluid bed reactor. The calculation was based on assumed values of condensable diluent gas concentrations, temperature, and pressure (as provided in the table) that are believed to be representative of Catalyst A in commercial operation.

TABLE 3

| | |
|---|---|
| 1-Hexene partial pressure (bar) | 0.217 |
| Isopentane partial pressure (bar) | 3.45 |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| ΔMIT, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$. was determined as the difference MIT−D, which produced an estimated value of 81.71° C. Since this was lower than the reactor temperature (Trx) of 85° C., the calculation thus determined that (this example) system was operating with a positive value of ΔMIT (=dMIT) equal to 3.38° C. Since this was less than the limiting range of dMIT values that apply for Catalyst A (6 to 8° C.), the reactor system would be expected to operate at the conditions above without excessive resin stickiness in the fluidized bed and, consequently, without an increased tendency for discontinuity events such as sheeting, chunking or fouling of the distributor plate or cooler caused by excessive stickiness, and without an increased tendency for production throughput limitations caused by excessive stickiness or limited resin flowability.

Several embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments allow production rates to be maximized (i.e., to proceed with maximum combinations of reactor temperature and ICA) while avoiding the conditions in the reactor (or combinations of conditions)) that would lead to excessive stickiness and discontinuity events. These embodiments use only readily available process and resin property data, and can be readily implemented at plant sites either on-line through process control systems (i.e., by processing the relevant data in a processor that has been programmed to implement the inventive method and calculations), or may be implemented off-line using available spreadsheets.

Several variations (or improvements) of the described examples of the inventive method that implement or otherwise use the above-described MIT depression model are contemplated:

other solubility correlations for ICA materials and comonomers can be employed;

other methods to predict (possibly more accurately) mutual solubilities in multi-component systems can be employed;

improved enthalpy of fusion values (ΔHu) can be employed to account for variation of ΔHu with polymer density. (It has been reported in the literature that ΔHu is a function of the polymer density.);

other equations may be used to predict the melting point depression, and dilatometry data can be used to predict (possibly more accurately) the polymer and diluent volume fractions.

Isomeric compounds (isomers of comonomers) present in fluid bed polymerization reactors are important in monitoring and optionally also controlling polymerization reactions occurring in the reactors (e.g., polyethylene polymerization reactions under metallocene catalyst polymerization conditions). Such isomeric compounds are relatively inert and can accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a significant impact of the melting point depression D and the reduced melt initiation temperature $MIT_R$ (or $MRT_R$). In a class, preferred embodiments of the invention recognize and account for the impact of accumulated isomers on the melting point depression D, and the resulting values of $MIT_R$ and dMIT (or $MRT_R$ and dMRT). Procedures to remedy the effects of accumulated isomers (such as controlled venting of the reactor as described below) may also be preferably implemented.

Gas chromatograph composition data for isomers in at least one commercial, gas phase, polyethylene polymerization reactor operating with a catalyst substantially equivalent to Catalyst A have been considered. The data were analyzed to characterize separately the 1-hexene comonomer and the $C_6$ and $C_6$+ isomers of the comonomer in samples of cycle gas from the reactor. The data indicated that isomer concentrations as high as 2.5 mole percent (of the total reactor gas) were obtained in the reactor system, which was substantially higher than the approximately 1 to 1.5 mole percent concentration of 1-hexene alone. Further, at these levels, the isomers themselves (excluding the comonomer) produced an increased depression of the MIT equal to 4° C., which represents a very significant potential impact on commercial operations, including the tendency for sheeting. It is expected that isomer concentrations greater than 2.5 mole percent would have a correspondingly greater impact on estimated degree of MIT depression and thus on likelihood of sheeting, unless corrective actions were taken (such as a reduction in the reactor temperature Trx) to maintain dMIT (or dMRT) within an acceptable range.

It is contemplated that the dry melt reference temperature (of a dry version of polymer resin being produced by polymerization) employed in various embodiments of the invention can be determined or defined in any of a number of different ways. For example, in some embodiments it is a peak polymer melt temperature determined from a first or second melt DSC measurement. In other embodiments, it is a polymer Seal Initiation Temperature measured on a resin film sample (for example, a seal initiation temperature as described in above-referenced U.S. Pat. No. 7,122,607), a resin Hot Tack Initiation Temperature (for example, a hot tack initiation temperature as described in U.S. Pat. No. 7,122, 607), a dry sticking temperature of granular polymer in a fluid bed (for example, a dry sticking temperature as described in U.S. Pat. No. 7,122,607), a Melt Initiation Temperature (MIT) determined graphically as the onset of rapid melting in a first or second melt DSC curve, a critical amorphous fraction determined from the melting distribution function (MDF), a dry sticking temperature at which agglomeration or fouling on any surface of the reactor vessel begins to occur with the reactor operating at normal pressure and gas velocity but in the presence of substantially pure nitrogen rather than the gas components actually present in the reactor during the reaction, or the temperature at which there is at least a 50% drop in bandwidth of a bed DP reading, where "bed DP reading" denotes measured pressure difference between the bottom and top of the fluid bed. Whatever method is employed to determine a melt reference temperature, it is important to ensure that a consistent method is used throughout the calculations, and that appropriate limits for dMRT (limits that apply for the particular melt reference temperature that is employed) are established, preferably through actual operating experience. In practice, limiting values of dMRT or dMIT are typically those values that correlate with an increased tendency for sheeting, chunking, and/or fouling of the distributor or cycle gas cooler. Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use correlations for the solubility of diluent gas components in the resin other than those presented in the examples. The inventors contemplate that other such methods may be constructively employed, as long as they provide an analysis of the diluent gas solubilities and the resulting depression of the polymer melting curve.

In a class of preferred embodiments, all condensable components that are present in significant amounts in the cycle gas stream (including isomers of the one or more comonomers) are measured and the step of determining estimated degree of MIT depression (or MRT depression) accounts for all such significant condensable components. This is important because isomers nevertheless may be present in small amounts, and may therefore have a substantial affect on the degree of MIT (or MRT) depression. Thus, consideration of the presence of isomers of each comonomer should be included as well as the ICA present. For example, if 1-hexene is used as the comonomer, the significant isomers may include 2-methyl-1-pentene, cis- and trans-2-hexene, and 3-hexene.

In some embodiments where all isomeric components are known, and solubility relationships for all the components are known, the total solubility of the isomers in the polymer product can be computed using Equation 13, by including appropriate parameters for each component. In other embodiments where carbon number is known (e.g. $C_4$, $C_6$, etc.) the solubility can be computed from Equation 13 using a total isomer concentration for each carbon number species. As such, a "lumped" value is expected to produce greater accuracy in computation of the degree of MIT (or MRT) depression since the solubilities for all of the individual isomer components of a given carbon number are expected to be similar.

Accurate accounting for isomers in determination of estimated degree of MIT or MRT depression is expected to provide benefits in many if not all embodiments of the invention, including those which generate reduced melt initiation temperature values (or dMIT values) based on bed-averaged parameters of steady-state reactions and use them to characterize and control the steady-state reactions, and those which generate reduced melt initiation temperature values (or dMIT values) based on instantaneous reaction parameters and use them to characterize and control the reactions during reaction transitions.

A specific control action to remedy the impact of isomers (of comonomers) on dMIT (or dMRT) is to vent isomers from the reactor/recycle system. Vented isomers may go to flare or to a recovery system separate from the reactor/recycle system of the reactor (which may be operating with a metallocene catalyst). As is well known to those skilled in the art, direct venting of the cycle gas to flare is possible, but is likely to be far from optimal due to the relatively high concentration of ethylene and other reactant gases that would also be vented in the process. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe an example of monitoring and controlling a gas-phase fluidized-bed polyethylene polymerization reaction in accordance with an embodiment of the invention. In this example, a programmed computer receives input data indicative of a set of monitored reaction parameters, and determines output data for controlling the reaction in response thereto. The monitored reaction parameters are defined as independent variables, $x_i$, in software executed by the programmed computer. The set of monitored reaction parameters includes:

production rate (setpoint);
reactor temperature (setpoint);
iC5 concentration (setpoint). "iC5" (which denotes isopentane) is used as an ICA;
superficial gas velocity (setpoint);
ethylene partial pressure (setpoint);
continuity aid feed rate; and
reactor pressure.

Parameters determined by the programmed computer in response to the monitored reaction parameters are defined in the software as dependent variables, $y_i$. These typically include:

catalyst feed cost;
monomer feed cost;
comonomer feed cost;
condensing agent feed cost;
transfer agent feed cost;
total raw materials cost;
value of total production;
profit (value of production minus cost of production); and
solids entrainment in cycle gas; and
optionally, at least one other variable cost (e.g. cost of electrical power, natural gas, and/or steam).

The software executed by the computer defines useful increments (deltas or $\Delta_i$) for changing independent variables, typically including the following:

production rate (e.g., 2 t/hr);
reactor temperature (e.g., 1 deg C.);
iC5 concentration (e.g., 1 mole percent);
superficial gas velocity (e.g., 0.05 ft/s);
ethylene partial pressure (e.g., 5 psid);
continuity aid feed rate (e.g., 1 ppm); and
reactor pressure (5 psid).

The software executed by the computer evaluates "change matrices" of form:

$$\nabla^+ = \left[\frac{\Delta y_i}{\Delta x_i}\right],$$

for positive deltas; and $$\nabla^- = \left[\frac{\Delta y_i}{\Delta x_i}\right],$$

for negative deltas.

The software executed by the computer evaluates constraint matrices for both change matrices. The constraint matrices typically include matrices for:
dMIT (operability);
finishing output limit (fixed);
cooling capacity (cooling valve output);
entrainment (operability); and
environmental limits.

The user instructs the computer as to desired outcome parameters, which can include:
maximum production rate;
minimum total cost; and
maximum profit.

The software executed by the computer determines at least one change in at least one of the independent variables that has a maximum impact on desired outcome, but rejects each possible change which does not meet at least one constraint indicated by a constraint matrix (e.g., rejects a possible change in ICA concentration that would increase production rate but produce an ICA concentration in the reactor that would allow a dMIT parameter to reach a constraint value, and thus be inconsistent with an acceptably low risk that polymer resin in the reactor will reach a condition of limiting stickiness).

The change determination step can be repeated on a specified basis (e.g., on a regular or other schedule as needed) to move commercial operations to conditions which optimize desired outcome.

We next describe examples of commercial-scale reactions (e.g., commercial-scale, gas-phase fluidized-bed polymerization reactions) that can be monitored and optionally also controlled in accordance with embodiments of the invention. Some such reactions can occur in a reactor having the geometry of reactor 10 of FIG. 1. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows; the fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by a continuous flow of make up feed and recycle gas through the reaction zone (i.e. the fluidized bed). In some implementations, a superficial gas velocity of 2.0 to 2.8 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for efficient removal of the product, while at the same time recycling a large portion of the unreacted gases back to the reactor. This product is purged to remove entrained and dissolved hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with embodiments of the invention. A fluidized bed reactor for performing such a process typically comprises a reaction zone and a velocity reduction zone (also known as an expanded section). The reaction zone comprises a bed of growing polymer particles, formed polymer particles and a minor amount of catalyst particles fluidized by a continuous flow of reactor gas through the reaction zone. Optionally, some of the recirculated gases may be cooled and compressed to form liquids that increase the heat removal capacity of the circulating gas stream when readmitted to the reaction zone. This method of operation is referred to as "condensed mode." A suitable rate of gas flow may be readily determined by simple experiment. Make up of gaseous monomer, comonomer and hydrogen to the circulating gas stream is at a rate equal to the rate at which particulate polymer product and monomer associated therewith is withdrawn from the reactor, so as to maintain an essentially steady state gaseous composition within the reaction zone. The gas leaving the reaction zone is passed to the velocity reduction zone where entrained particles are removed. Finer entrained particles and dust may be removed in a cyclone and/or fines filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed to maximize heat removal capabilities. The upper limit for the reactor temperature is believed to be or primarily related to the sintering temperature of the polymer product, and the sintering temperature is a function of condensable gas concentrations and product properties in the reactor. However, there is no generally recognized method in the art for establishing numerical limits for limiting the upper limit reactor temperature; and, similarly, there is no method in the art that provides a basis for adjusting (or changing) the limiting temperature to account for changes in condensable gas concentrations and product properties in the reactor.

In a class of embodiments, the present method provides for a quantitative basis for setting the temperature limits based on the $MIT_R$ (the temperature at which the onset of melting is expected to occur in the reactor) or $MRT_R$ (the reduced melt reference temperature, which is typically a temperature that is representative of the melting characteristics of the polymer as it exists in the reactor). The upper limit of reactor temperature may be preferably set just below (e.g. 1° C. to 3° C. below) the limiting value of dMIT (or dMRT), defined above. The limiting value of dMIT thus provides a quantitative basis for setting the maximum reactor temperature based on current conditions in the reactor (including current values of condensable gas concentrations and resin product properties). The limiting value of dMIT is the maximum amount by which the reactor temperature can exceed the $MIT_R$ without causing discontinuity events that are (based on the present teachings) the result of excessive stickiness of the polymer product.

In other embodiments, a reactor whose operation is monitored and optionally also controlled in accordance with the invention effects polymerization by a slurry polymerization process. Non-limiting examples of slurry processes include continuous loop or stirred tank processes. A slurry polymerization process generally uses pressures in the range of from 1 to 50 atmospheres, and temperatures in the range of 0° C. to 120° C., and more particularly from 30° C. to 100° C. In a slurry polymerization process, a slurry of solid, particulate polymer is formed in a liquid polymerization diluent medium to which monomer, comonomers, catalyst, and often hydrogen are added. The slurry including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and chemically non-reactive with the catalyst and monomers employed in the reactor system. In some embodiments, a hexane, isopentane or isobutane diluent is employed.

In other embodiments, a reaction monitored and optionally also controlled in accordance with the invention is or includes particle form polymerization, or a slurry process in which the temperature is kept below the temperature at which a substantial portion of the polymer goes into solution. In some embodiments, a particle form polymerization reaction monitored and optionally also controlled in accordance with the invention is a slurry loop reactor, in which a circulation pump is employed to circulate the slurry through heat exchanger tubes to remove the heat of polymerization. In the slurry loop embodiment, the temperature and pressure of the slurry polymerization process are preferably operated above the thermodynamic critical point of the diluent to avoid the possibility of cavitation in the slurry circulation pump. In other embodiments, a reaction monitored and optionally also controlled in accordance with the invention is carried out in a plurality of slurry loop reactors or stirred tank reactors in series, parallel, or combinations thereof.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; or ethylene and a comonomer comprising from 3 to 12 carbon atoms in another embodiment; or ethylene and a comonomer comprising from 4 to 10 carbon atoms in yet another embodiment; or ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, one or more comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen reduce the molecular weight and increase the melt index (MI) of the polyolefin generated. The MI can thus be influenced by the hydrogen concentration. The amount of hydrogen in the polymerization can be expressed as a mole ratio relative to the dominant polymerizable monomer that is present in the reactor; for example, ethylene or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a metallocene or metallocene-type catalyst system and in the absence of, or essentially free of, any scavengers, such as triethylaluminum, trimethylaluminum, tri-isobutylaluminum and tri-n-hexylaluminum and diethyl aluminum chloride, diethyl zinc and the like. By "essentially free", it is meant that these compounds are not deliberately added to the reactor or any reactor components, and if present, are present to less than 10 ppm in the reactor.

Examples of polymers that can be produced in accordance with the invention include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more $C_2$-$C_{18}$ alpha olefin; terpolymers of one or more $C_2$-$C_{18}$ alpha olefins with a diene.

Monomers that can be present in a reactor monitored and optionally also controlled in accordance with the invention include one or more of: $C_2$-$C_{18}$ alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts may be used with cocatalysts and promoters well known in the art. Typically the cocatalysts and promoters may include alkylaluminums, alkylaluminum halides, alkylaluminum hydrides, as well as aluminoxanes. For illustrative purposes only, examples of suitable catalysts include Ziegler-Natta catalysts, chromium based catalysts, vanadium based catalysts (e.g., vanadium oxychloride and vanadium acetylacetonate), metallocene catalysts and other single-site or single-site-like catalysts as well as constrained geometry catalysts, cationic forms of metal halides (e.g., aluminum trihalides), anionic initiators (e.g., butyl lithiums), cobalt catalysts and mixtures thereof, nickel catalysts and mixtures thereof, iron catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

It is to be understood that while the invention has been described in conjunction with the specific embodiments and examples thereof, the foregoing description is intended to illustrate and not limit the scope of the invention. Other aspects, advantages and modifications will be apparent to those skilled in the art to which the invention pertains.

What is claimed is:

1. A method for monitoring a polymer resin-producing polymerization reaction in a fluid bed reactor, where a dry melt reference temperature is characteristic of melting behavior of a dry version of the polymer resin, said method including the steps of:
   (a) monitoring the reaction to generate monitoring data indicative of at least one parameter of the reaction, including a concentration of at least one condensable diluent gas in the reactor;
   (b) determining in on-line fashion a maximum ICA concentration in the reactor, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the maximum ICA concentration a greatest ICA concentration inconsistent with reactor temperature reaching the reduced melt reference temperature in the presence of the at least one condensable diluent gas, whereby performing the reaction with ICA concentration less than the maximum ICA concentration ensures an acceptably low risk that the polymer resin in the reactor with the at least one condensable diluent gas will reach a condition of limiting stickiness; and (c) in on-line fashion, determining whether the maximum ICA concentration is less than an unconstrained optimal ICA concentration for performing the reaction with a desired production rate but without constraint against reaching the condition of limiting stickiness, identifying the unconstrained ICA concentration as an optimal ICA concentration in the reactor if the unconstrained ICA concentration is less than the maximum ICA concentration, and identifying the maximum ICA concentration as the optimal ICA concentration in the reactor if said unconstrained ICA concentration is not less than said maximum ICA concentration.

2. The method of claim 1, wherein the maximum ICA concentration determined in step (b) is the maximum ICA concentration in the reactor inconsistent with bed temperature in the reactor reaching the reduced melt reference temperature in the presence of the at least one condensable diluent gas.

3. The method of claim 1, wherein the maximum ICA concentration determined in step (b) is the maximum ICA concentration in the reactor inconsistent with skin temperature in the reactor reaching the reduced melt reference temperature in the presence of the at least one condensable diluent gas.

4. The method of claim 1, wherein step (b) includes the steps of:
determining a stickiness control parameter from the reduced melt reference temperature.

5. The method of claim 4, also including the step of:
controlling the reaction in response to the stickiness control parameter in an effort to prevent occurrence of at least one of a discontinuity event and a production rate constraint.

6. The method of claim 4, also including the step of:
performing closed loop control of the reaction in response to the stickiness control parameter in an effort to prevent occurrence of at least one of a discontinuity event and a production rate constraint.

7. The method of claim 4, also including the step of:
controlling the reaction in response to the stickiness control parameter in an effort to prevent occurrence of a discontinuity event.

8. The method of claim 1, also including the step of:
determining the unconstrained optimal ICA concentration in on-line fashion.

9. The method of claim 1, also including the step of:
controlling the reaction to achieve a desired production rate by controlling ICA concentration in the reactor to be at least substantially equal to the optimal ICA concentration.

10. The method of claim 1, also including the step of:
performing closed loop control of the reaction to achieve a desired production rate including by controlling ICA concentration in the reactor to be at least substantially equal to the optimal ICA concentration.

11. The method of claim 1, also including the step of:
controlling the reaction to prevent at least one of bed temperature and skin temperature in the reactor from reaching the reduced melt reference temperature.

12. The method of claim 1, also including the steps of:
controlling the reaction to achieve a desired production rate by controlling ICA concentration in the reactor to be at least substantially equal to the optimal ICA concentration; and
controlling the reaction to prevent at least one of bed temperature and skin temperature in the reactor from reaching the reduced melt reference temperature.

13. The method of claim 1, wherein the monitoring data generated in step (a) are also indicative of reactor temperature and at least one resin property of the polymer resin.

14. The method of claim 1, wherein the dry melt reference temperature is a dry melt initiation temperature, the reduced melt reference temperature determined in step (b) is a reduced melt initiation temperature, and step (b) includes the step of:
determining the reduced melt initiation temperature in on-line fashion in accordance with a melt initiation temperature depression model for the reaction assuming reaction conditions indicated by the monitoring data, where the melt initiation temperature depression model identifies an estimated degree of depression of the dry melt initiation temperature due to presence of at least one diluent with the polymer resin.

15. The method of claim 14, wherein step (b) includes the step of determining the maximum ICA concentration to be a greatest ICA concentration inconsistent with reactor temperature reaching the reduced melt initiation temperature in the presence of the at least one condensable diluent gas whose concentration is indicated by the monitoring data.

16. The method of claim 14, wherein the melt initiation temperature depression model implements the Flory melt depression equation.

17. The method of claim 14, wherein step (b) includes the steps of:
determining a stickiness control parameter from the reduced melt initiation temperature.

18. The method of claim 17, also including the step of:
controlling the reaction in response to the stickiness control parameter in an effort to prevent occurrence of a discontinuity event.

19. The method of claim 14, wherein the reaction polymerizes ethylene and at least one comonomer in the presence of a catalyst selected from a group consisting of Ziegler-Natta, chromium, chromium oxide, $AlCl_3$, cobalt, iron, palladium, constrained-geometry catalyst, and metallocene catalyst.

20. The method of claim 19, wherein the polymer resin is polyethylene and each said comonomer is a $C_3$-$C_{10}$ alpha olefin.

21. The method of claim 14, wherein the polymer resin is a polyolefin.

22. The method of claim 14, wherein the polymer resin is polyethylene.

23. The method of claim 1, wherein the reaction polymerizes ethylene and at least one comonomer in the presence of a catalyst selected from a group consisting of Ziegler-Natta, chromium, chromium oxide, $AlCl_3$, cobalt, iron, palladium, constrained-geometry catalyst, and metallocene catalyst.

24. The method of claim 23, wherein the polymer resin is polyethylene and each said comonomer is a $C_3$-$C_{10}$ alpha olefin.

25. The method of claim 1, wherein the polymer resin is a polyolefin.

26. The method of claim 1, wherein the polymer resin is polyethylene.

27. A method for monitoring a polymer resin-producing polymerization reaction in a fluid bed reactor, where a dry melt reference temperature is characteristic of melting behavior of a dry version of the polymer resin, said method including the steps of:
(a) monitoring the reaction to generate monitoring data indicative of at least one parameter of the reaction, including a concentration of at least one condensable diluent gas in the reactor;
(b) determining in on-line fashion a limiting value of diluent concentration in the reactor for performing the reaction with acceptably low risk that the polymer resin in the reactor will reach a condition of limiting stickiness, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the limiting value of diluent concentration an extremum value of the diluent concentration inconsistent with reactor temperature reaching the reduced melt reference temperature in the presence of the at least one condensable diluent gas; and (c) in on-line fashion, comparing the limiting value of diluent concentration with an unconstrained optimal value of diluent concentration for performing the reaction with a desired production rate but without constraint against reaching the condition of limiting stickiness, and identifying one of the limiting value and the unconstrained optimal value as an optimal value of diluent concentration as a result of the comparison.

28. The method of claim 27, wherein step (c) includes steps of:
determining whether the limiting value of diluent concentration is less than the unconstrained optimal value of diluent concentration, identifying the unconstrained optimal value as the optimal value if the unconstrained optimal value is less than the limiting value of diluent concentration, and identifying the limiting value as the optimal value if said unconstrained optimal value of diluent concentration is not less than said limiting value.

29. The method of claim 27, wherein the limiting value of diluent concentration is a limiting value of concentration in the reactor of at least one non-ICA diluent.

30. The method of claim 29, wherein the limiting value of diluent concentration is a limiting value of concentration in the reactor of at least one of a comonomer and an isomer of a comonomer.

31. The method of claim 27, wherein the reaction polymerizes ethylene and at least one comonomer in the presence of a catalyst selected from a group consisting of Ziegler-Natta, chromium, chromium oxide, $AlCl_3$, cobalt, iron, palladium, constrained-geometry catalyst, and metallocene catalyst.

32. The method of claim 31, wherein the polymer resin is polyethylene and each said comonomer is a $C_3$-$C_{10}$ alpha olefin.

33. The method of claim 27, wherein the polymer resin is a polyolefin.

34. The method of claim 27, wherein the polymer resin is polyethylene.

35. The method of claim 27, wherein step (b) includes the steps of:
determining a stickiness control parameter from the reduced melt reference temperature.

36. The method of claim 35, also including the step of:
controlling the reaction in response to the stickiness control parameter in an effort to prevent occurrence of at least one of a discontinuity event and a production rate constraint.

37. The method of claim 35, also including the step of:
performing closed loop control of the reaction in response to the stickiness control parameter in an effort to prevent occurrence of at least one of a discontinuity event and a production rate constraint.

38. The method of claim 35, also including the step of:
controlling the reaction in response to the stickiness control parameter in an effort to prevent occurrence of a discontinuity event.

39. The method of claim 27, also including the step of:
determining the unconstrained optimal value of diluent concentration in on-line fashion.

40. The method of claim 27, wherein the limiting value of diluent concentration is a limiting value of concentration in the reactor of at least one non-ICA diluent, and also including the step of:
controlling the reaction to achieve a desired production rate by controlling concentration in the reactor of the at least one non-ICA diluent to be at least substantially equal to the optimal concentration.

41. The method of claim 27, also including the step of:
performing closed loop control of the reaction to achieve a desired production rate, including by controlling concentration in the reactor of the at least one non-ICA diluent to be at least substantially equal to the optimal concentration.

42. The method of claim 27, also including the step of:
controlling the reaction to prevent at least one of bed temperature and skin temperature in the reactor from reaching the reduced melt reference temperature.

43. A method for monitoring a polymer resin-producing polymerization reaction in a fluid bed reactor, where a dry melt reference temperature is characteristic of melting behavior of a dry version of the polymer resin, said method including the steps of:

(a) monitoring the reaction to generate monitoring data indicative of at least one parameter of the reaction, including a concentration of at least one condensable diluent gas in the reactor;

(b) determining in on-line fashion a maximum diluent concentration in the reactor, by determining in response to the monitoring data a reduced melt reference temperature, $MRT_R$, characteristic of melting behavior of the polymer resin as it exists in the reactor, where $MRT_R$ is at least substantially equal to the dry melt reference temperature minus a melt reference temperature depression value by which the dry melt reference temperature is depressed by presence of the at least one condensable diluent gas with the resin in the reactor, and identifying as the maximum diluent concentration a greatest diluent concentration inconsistent with reactor temperature reaching the reduced melt reference temperature in the presence of the at least one condensable diluent gas, whereby performing the reaction with diluent concentration less than the maximum diluent concentration ensures an acceptably low risk that the polymer resin in the reactor with the at least one condensable diluent gas will reach a condition of limiting stickiness; and (c) in on-line fashion, determining whether the maximum diluent concentration is less than an unconstrained optimal diluent concentration for performing the reaction with a desired production rate but without constraint against reaching the condition of limiting stickiness, identifying the unconstrained diluent concentration as an optimal diluent concentration in the reactor if the unconstrained diluent concentration is less than the maximum diluent concentration, and identifying the maximum diluent concentration as the optimal diluent concentration in the reactor if said unconstrained diluent concentration is not less than said maximum diluent concentration.

44. The method of claim 43, wherein the maximum diluent concentration determined in step (b) is the maximum diluent concentration in the reactor inconsistent with bed temperature in the reactor reaching the reduced melt reference temperature in the presence of the at least one condensable diluent gas.

45. The method of claim 43, wherein the maximum diluent concentration determined in step (b) is the maximum diluent concentration in the reactor inconsistent with skin temperature in the reactor reaching the reduced melt reference temperature in the presence of the at least one condensable diluent gas.

46. The method of claim 43, wherein step (b) includes the steps of:

determining a stickiness control parameter from the reduced melt reference temperature.

47. The method of claim 46, also including the step of:

controlling the reaction in response to the stickiness control parameter in an effort to prevent occurrence of at least one of a discontinuity event and a production rate constraint.

48. The method of claim 46, also including the step of:

performing closed loop control of the reaction in response to the stickiness control parameter in an effort to prevent occurrence of at least one of a discontinuity event and a production rate constraint.

49. The method of claim 46, also including the step of:

controlling the reaction in response to the stickiness control parameter in an effort to prevent occurrence of a discontinuity event.

50. The method of claim 43, also including the step of:

determining the unconstrained optimal diluent concentration in on-line fashion.

51. The method of claim 43, also including the step of:

controlling the reaction to achieve a desired production rate by controlling diluent concentration in the reactor to be at least substantially equal to the optimal diluent concentration.

52. The method of claim 43, also including the step of:

performing closed loop control of the reaction to achieve a desired production rate, including by controlling diluent concentration in the reactor to be at least substantially equal to the optimal diluent concentration.

53. The method of claim 43, also including the step of:

controlling the reaction to prevent at least one of bed temperature and skin temperature in the reactor from reaching the reduced melt reference temperature.

54. The method of claim 43, wherein the monitoring data generated in step (a) are also indicative of reactor temperature and at least one resin property of the polymer resin.

55. The method of claim 43, wherein the dry melt reference temperature is a dry melt initiation temperature, the reduced melt reference temperature determined in step (b) is a reduced melt initiation temperature, and step (b) includes the step of:

determining the reduced melt initiation temperature in on-line fashion in accordance with a melt initiation temperature depression model for the reaction assuming reaction conditions indicated by the monitoring data, where the melt initiation temperature depression model identifies an estimated degree of depression of the dry melt initiation temperature due to presence of at least one diluent with the polymer resin.

56. The method of claim 55, wherein the melt initiation temperature depression model implements the Flory melt depression equation.

57. The method of claim 55, wherein step (b) includes the steps of:

determining a stickiness control parameter from the reduced melt initiation temperature.

58. The method of claim 55, wherein the reaction polymerizes ethylene and at least one comonomer in the presence of a catalyst selected from a group consisting of Ziegler-Natta, chromium, chromium oxide, $AlCl_3$, cobalt, iron, palladium, constrained-geometry catalyst, and metallocene catalyst.

59. The method of claim 58, wherein the polymer resin is polyethylene and each said comonomer is a $C_3$-$C_{10}$ alpha olefin.

60. The method of claim 55, wherein the polymer resin is polyethylene.

61. The method of claim 43, wherein the reaction polymerizes ethylene and at least one comonomer in the presence of a catalyst selected from a group consisting of Ziegler-Natta, chromium, chromium oxide, $AlCl_3$, cobalt, iron, palladium, constrained-geometry catalyst, and metallocene catalyst.

62. The method of claim 61, wherein the polymer resin is polyethylene and each said comonomer is a $C_3$-$C_{10}$ alpha olefin.

63. The method of claim 43, wherein the polymer resin is a polyolefin.

64. The method of claim 43, wherein the polymer resin is polyethylene.

* * * * *